United States Patent
Wang et al.

(10) Patent No.: US 12,218,950 B1
(45) Date of Patent: *Feb. 4, 2025

(54) STATE DETERMINATION AND DEVICE CONTROL

(71) Applicant: Amazon Technologies, Inc., Seattle, WA (US)

(72) Inventors: Hongyang Wang, Seattle, WA (US); Sunny Singh, Seattle, WA (US); Xiaodong Tian, Issaquah, WA (US); Marc Wetter, Burien, WA (US); Yishuai Li, Woodinville, WA (US); Chandra Prakash Konkimalla, Seattle, WA (US); Jagrut Arora, Seattle, WA (US); Shirish R Nair, Shoreline, WA (US); Paul Aksenti Savastinuk, Bainbridge Island, WA (US); William Evan Welbourne, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 315 days.

This patent is subject to a terminal disclaimer.

(21) Appl. No.: 17/591,327

(22) Filed: Feb. 2, 2022

(51) Int. Cl.
*H04L 9/40* (2022.01)

(52) U.S. Cl.
CPC ........ *H04L 63/107* (2013.01); *H04L 63/0876* (2013.01); *H04L 63/102* (2013.01); *H04L 63/20* (2013.01)

(58) Field of Classification Search
CPC . H04L 63/107; H04L 63/0876; H04L 63/102; H04L 63/20
See application file for complete search history.

(56) References Cited

U.S. PATENT DOCUMENTS

| | | | |
|---|---|---|---|
| 2017/0034656 A1* | 2/2017 | Wang | H04W 4/021 |
| 2018/0374429 A1* | 12/2018 | Nakamura | G09G 3/344 |
| 2020/0213407 A1* | 7/2020 | Jung | H04L 12/2829 |
| 2020/0379538 A1* | 12/2020 | Hefner | G06F 1/1641 |

* cited by examiner

*Primary Examiner* — Mohammad W Reza
(74) *Attorney, Agent, or Firm* — Lee & Hayes, P.C.

(57) ABSTRACT

Systems and methods for security-based device control are disclosed. For example, a presence-based trigger event is detected and one or more suggestion models are utilized to determine whether a security-based device control suggestion should be sent. Multiple suggestions are arbitrated, and a user device is selected for receiving the suggestion based on multiple inputs. The format of the suggestion is also determined and the suggestion is either automatically output on the selected device or a notification of the suggestion is provided.

20 Claims, 15 Drawing Sheets

800

Determine, based at least in part on first data associated with presence detection within environment, that transition from first presence state to second presence state has occurred in association with environment, second presence state indicating that user presence has ceased being detected in association with environment
802

Receive, based at least in part on transition, second data indicating first device state of first device associated with environment, first device associated with security-related functionality
804

Generate, based at least in part on first device being associated with security-related functionality and being in first device state, third data representing first suggestion to transition first device from first device state to second device state
806

Determine, based at least in part on account data, second device that was associated with first presence state
808

Send command to second device, command causing second device to output first suggestion based at least in part on first device being associated with security-related functionality
810

STATE DETERMINATION AND DEVICE CONTROL

BACKGROUND

Internet-of-things devices have become more common in homes and other environments. Some of these devices are associated with certain functionality, such as locks, doors, and security systems. Described herein are improvements in technology and solutions to technical problems that can be used to, among other things, enhance use of smart home devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 illustrates a conceptual diagram of example data types utilized for generating device control suggestions and for selecting devices to send the suggestions to.

FIG. 8 illustrates a flow diagram of another example process for state determination and device control.

DETAILED DESCRIPTION

Figure 1:
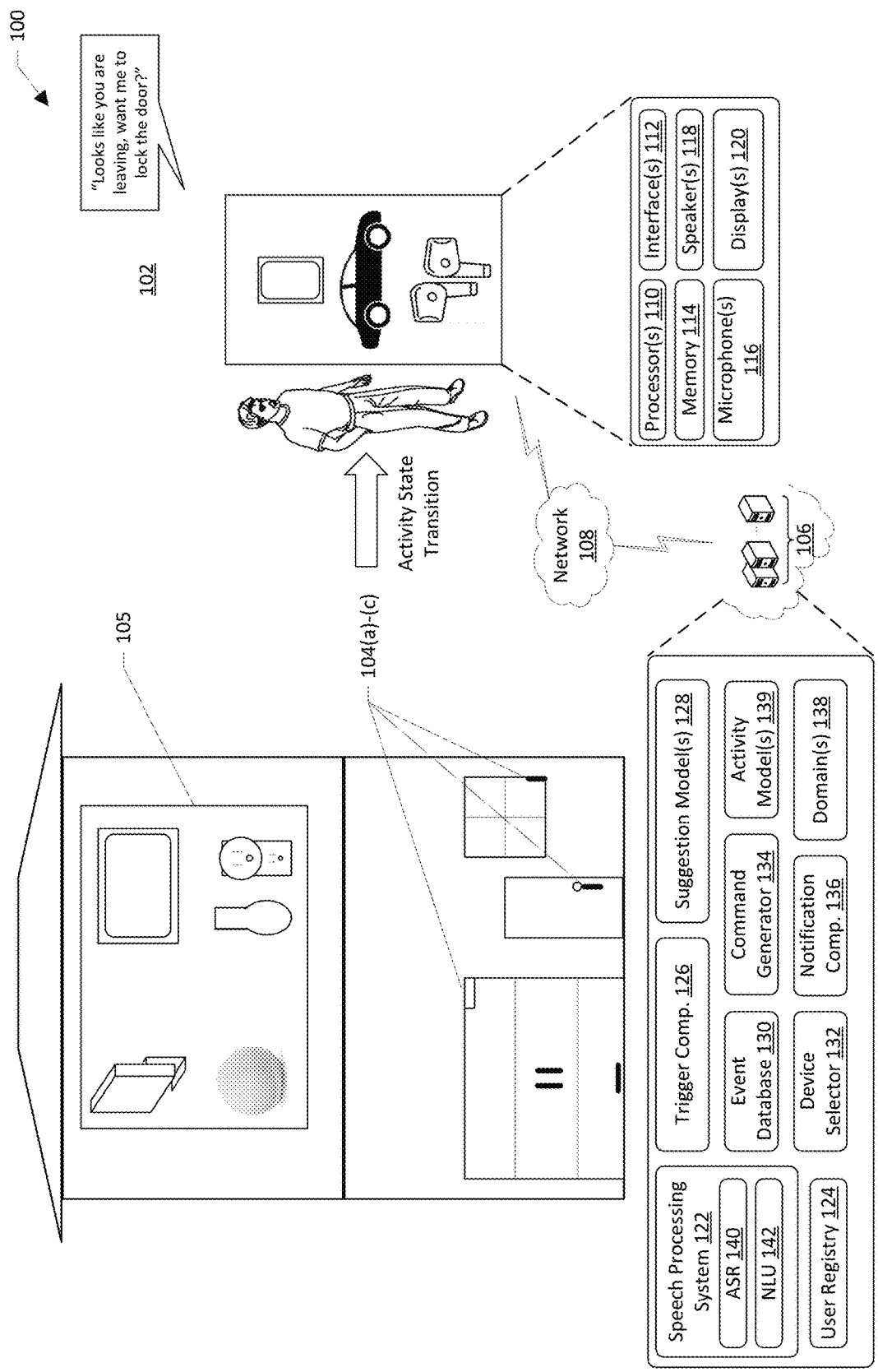
FIG. 1 illustrates a schematic diagram of an example environment for system state determination and device control.

Systems and methods for state determination and device control are disclosed. Take, for example, an environment (such as a home, hotel, vehicle, office, store, restaurant, or other space) where one or more users may be present. The environments may include one or more electronic devices that may be utilized by the users or may otherwise be utilized to detect conditions associated with the environments. For example, the electronic devices may include voice interface devices (e.g., smart speaker devices, mobile phones, tablets, personal computers, televisions, appliances like refrigerators and microwaves, etc.), graphical interface devices (e.g., televisions, set top boxes, virtual/augmented reality headsets, etc.), and/or touch interface devices (tablets, phones, steering wheels, laptops, kiosks, billboard, other devices with buttons, etc.). These electronic devices may be situated in a home, in a place of business, healthcare facility (e.g., hospital, doctor's office, pharmacy, etc.), in a vehicle (e.g., airplane, truck, car, bus, etc.) in a public forum (e.g., shopping center, store, etc.), and/or at a hotel/quasi-public area, for example. As used herein, a "target device" may include an electronic device that is configured to at least receive a signal from one or more devices to cause the target device to perform one or more functionalities. By way of example, a target device may be a "smart" lock that is configured to receive a command to lock or unlock a mechanism of the device, a "smart" garage door that is configured to receive a command to open or shut, a "smart" lightbulb that is configured to turn ON/OFF/dim/adjust brightness, and a security system that is configured to receive a command to arm or disarm the responses based on the monitoring of sensors on doors and/or windows, for example.

Some devices are now "smart devices" that include networking functionality or otherwise are able to communicate with other devices. For example, a garage door, door lock, or security system may be "smart" or otherwise are configured with computing components that allow for the sending and receipt of signals to operate those devices. For example, a garage door opener, door lock, and security system can be operated remotely such as from a computer, phone, or otherwise. With this available technology, it would be beneficial to have a system that allows for suggestions or otherwise "hunches" to be sent to user devices reminding users to operate certain device, such as security-related devices. However, given the sensitive nature of operating or not operating these devices, particularly where not engaging a security-related device may leave an environment unsecure for a period of time, suggestions to operate such devices may be provided with care.

To do so, a system may include a trigger component that may be configured to detect one or more trigger events for providing a device control suggestion to a user device. For example, the trigger component may detect changes in user presence states associated with a given environment. To illustrate, a user may move from outside an environment, such as a home for example, to within the environment. While the user is within the environment, the trigger component or another component of the system may detect the user's presence through one or more methodologies, some embodiments of which are described in more detail herein. For example, acoustic event detection techniques may be utilized to detect sounds within the environment that are indicative of user presence, such as talking, footsteps, the use of appliances, etc. Additionally, or alternatively, when approved to do so by user account data, image data associated with the environment may be processed to determine that an object in the environment is a user and/or that an object is moving such that presence is indicated. Additionally, or alternatively, device data such as the detection of a user personal device within the environment and/or movement of the user personal device may indicate presence. Additionally, or alternatively, state data indicating the changing of device states for devices of the environment may indicate that a user is present in the environment. These and other examples for detecting user presence and the transition of user presence associated with an environment are described in more detail below.

The trigger component may receive an indication of an activity state transition from one or more activity models. The activity models may be configured for a profile (e.g., personal, household, and/or other type of profile), and may be configured to accept event data and generate, as output, results indicating that given event data suggests a given user's activity state and, in examples, a confidence value associated with the activity state determination. The activity models may include a historical-activity model, which may be configured to determine an activity state associated with historical events associated with a device and/or environment. For example, the historical-activity model may be configured to accept, as features to the historical-activity model, event data corresponding to historical events. The historical-activity model may generate, as output, data indicating that a given historical event corresponded to a given activity state. For example, the historical-activity model may be utilized to determine that a given time a week prior to making the determination that a given environment was associated with an asleep state, for example, based at least in part on the event data associated with that given time.

The activity models may also include a current-activity model, which may be configured to determine an activity state associated with recent events associated with a user profile and/or environment. For example, recent events may include events that are currently occurring, such as receipt of audio data indicating presence, and/or receipt of an indication that a device was just operated. In examples, use of the current-activity model may be in association with a given device and/or a system causing one or more sensors or other components of the device to generate data indicating recent events to be utilized by the current-activity model. The current-activity model may generate, as output, data indicating that a given event corresponds to a given activity state. For example, the current-activity model may be utilized to determine that at a current time a given environment is associated with an active state based at least in part on event data associated with the current time. In examples, the current-activity model may be trained based at least in part on the output from the historical-activity model.

The activity models may also include a future-activity model, which may be configured to predict an activity state associated with events that may occur in the future with respect to an electronic device and/or environment. For example, the future-activity model may be configured to accept, as input features, event data corresponding to the historical events and/or live or near-live events. The future-activity model may generate, as output, data indicating that a given event that is likely to occur at a particular time in the future and/or is likely to correspond to a given activity state. For example, the future-activity model may be utilized to determine that at a given time a week from when the determination is made a given environment is likely to be associated with an away state, for example, based at least in part on historical event data and/or current event data associated with the given environment. In examples, the future-activity model may be trained based at least in part on the output from the historical-activity model and/or the current-activity model. For example, the output of the historical-activity model may include determinations of activity state at past times, while output of the current-activity model may include determinations of activity state at a current time. These activity state determinations may be utilized to train the future-activity model, such as by providing indications of activity state at given times of day and/or days of the week.

The activity models may be made available to one or more applications associated with the remote system and/or one or more other systems. For example, one or more applications may be able to utilize activity state determinations to generate more accurate results and/or to determine when to perform certain operations, such as when to generate and/or send a recommendation and/or other type of notification, when to operate a device (e.g., when to transition a state of a device), etc. Example recommendations or device-control suggestions are described in detail below.

When determining the activity states, event labeling may be performed. For example, if a user activates a feature of a smart home system, one or more machine learning models may be generated and be configured to accept the event data associated with a particular user account. Training algorithms may perform an analysis of the event data, including labelling the event data with one or more indicators of an activity state. For example, the training models may include a supervised machine learning model that has been configured to apply one or more rules to given events to label those events with an activity state. For example, event data indicating that a light has been turned on may be labeled by the supervised machine learning model as being associated with an active state, as opposed to an inactive state (e.g., asleep or away).

It should be understood that, in examples, an inactive state may include an away state and/or an asleep state. In an away state, presence of a user may not be detected in an environment associated with one or more sensors configured to detect presence. In an asleep state, presence of the user may be detected or not, and can represent when the system is confident the away state should not be activated (e.g., no signal all users left the environment) despite the user not moving or otherwise not interacting with the environment, such as by not providing commands for devices to perform operations (e.g., because all users are sleeping). This is in contrast to an active state, where presence of the user's activity is detected. For example, the system may be able to determine when the user is moving and/or otherwise actively interacting with the environment, such as by walking, talking, changing positions, and/or giving commands, for example. The system may determine that user profile data is associated with an active state when one or more signals, such as from smart-home devices or otherwise accessory devices, are received that indicate that a user associated with the user profile data is present and is engaged in an activity in the environment. The one or more signals may include, for example, device-beacon data received from a user device associated with the user that indicates the device is in the environment and that the device is moving. The one or more signals may also include, for example, data indicating interaction of the user with a voice user interface, such as a voice user interface associated with a voice-enabled device. The one or more signals may also include, for example, data indicating that a wake word has been detected, such as by a voice-enabled device. The one or more signals may also include, for example, receipt of user input data requesting operation of a device in the environment. The one or more signals may also include, for example, data indicating that a smart-home device is being operated and/or that another device is being operated and a smart-home device or other device having sensors described herein has detected operation of the smart-home device. Such operations may include, for example, turning lights on and/or off, turning appliances on and/or off from the appliances themselves as opposed to from an application running on a mobile user device, a wireless router device or other network access point receiving data indicating a SSID of a personal device of a user and an indication that such a device is sending data, motion sensor data, ambient noise detection, acoustic event detections, ambient light determinations, force value detections from devices such as smart beds, etc.

Additionally, for the inactive states, such as the away state or the asleep state, the one or more signals may include the same or similar signals as described above, but where those signals indicate that users are absent from the environment, or that users are present but are asleep. For example, when no device-beaconing data is received, such an occurrence indicates that no mobile personal devices are within the environment, which may be utilized to help determine that user profile data is associated with an away mode. Other examples where the signals indicate that user profile data is associated with an away mode include ambient noise satisfying a threshold noise value indicating an environment is emitting only typical ambient background noise. Other indications may include the lack of interaction with smart-home devices, such as for at least a threshold period of time. The one or more signals may also indicate an asleep state in instances where the signals indicate that a user is present, such as from device-beaconing data, but the signals otherwise indicate an inactive state, such as from data indicating a lack of interaction with smart-home devices, a lack of acoustic event detection for events such as footsteps, the lack of detection of user speech from audio data captured by a microphone in the environment, etc. Additionally, the one or more sensors may be configured to detect noises and/or posture indicating an asleep state. For example, breathing and/or snoring may be audible and may be detected from audio data captured from the environment. In further examples, radar-based sensors, such as ultrasonic sensors, may be configured to determine, when user consent has been provided to collect such data, a location of a user, which may indicate that a user is in a sleeping position. Additionally, in examples where the sensors are included in a smart bed, or other object associated with sleeping, signals from those sensors, such as an indication that someone is on the bed, may be utilized. Additionally, contextual data such as the time of day, day of the week, and/or historical data indicating when user profile data is associated with an asleep state may be utilized. For example, it may be more likely that user profile data is associated with an asleep state during the nighttime, such as on a weeknight. Some or all of this information may be utilized to determine that user profile data is associated with an asleep state.

The activity models may also be configured to select which data from the various devices is to be used and what data is specifically not to be used. For example, device state data from certain devices, particularly security-related devices, may indicate activity states, but may not be used in the event that such data would result in an inaccurate prediction of activity state. For example, a door lock device may indicate that a door is currently unlocked. Such a signal may indicate that a user is present in the environment, even when other data indicates the user has moved away from the environment. Similarly, a garage door opening device may indicate that a garage door is open and thus that a user is potentially present even if the user has left the environment but forgot to close the garage door. Likewise, a security system may be in a disarmed state indicating the user is present, but again the user may have just forgot to arm the security system. In these and other examples, the device type of the devices at issue may be utilized to determine which device data to utilize for activity state prediction. In examples, data from device types associated with security-related functionality or otherwise from device types that have been determined to not be utilized for detecting presence, such as door locks, security systems, garage doors, window sensors, door sensors, motion sensors, etc. may not be utilized or may be given limited weight when determine activity states of the system at issue. It should be noted that any or all of the data noted herein to be used to determine presence and/or state may only be used in embodiments after the user has explicitly authorized the system to have access to this data and that some systems may make any or all of the functionality described herein an "opt-in" type of functionality, which the user can opt out of and/or cause deletion of any or all of the data used by the system.

The trigger component noted above may determine that the activity state of the environment changes from a first activity state to a second activity state. For example, the first activity state may be associated with detection of user presence in the environment. The second activity state may be associated with ceasing detection of user presence in the environment and/or detecting that a user is moving away from an environment but that the user has not yet left the environment. When these or other trigger events are detected, the system may query one or more suggestion models to determine whether a device control suggestion should be sent, and if so, what the suggestion should be. For example, given the activity state transition, the devices that were purposefully not used to determine the activity state may be queried for their device states to determine whether those device states are associated with the current activity state. In examples, the suggestion models may each be configured to determine a suggestion for a given device and/or device type. For example, a first suggestion model may be configured to determine whether a suggestion should be sent to operate a smart lock, a second suggestion model may be configured to determine whether a suggestion should be sent to operate a garage door, a third suggestion model may be configured to determine whether a suggestion should be sent to operate a security system, etc. Each of these models may run in parallel when a given trigger event is detected by the trigger component.

To illustrate, utilizing the three suggestion models highlighted above as an example, the lock suggestion model may determine whether the account data associated with the environment at issue indicates that device control suggestions are eligible to be sent. For example, the account data may indicate whether user preferences have been set up and indicate that suggestions are enabled. The account data may also indicate whether the environment includes a device with a device type associated with the suggestion model and/or whether the account data indicates that the user has a personal user device to send data representing the suggestion to. When the account data indicates that the device control suggestion is eligible to be sent, data associated with the devices at issue, the environment, and/or the trigger event may be received. This data may include indicators of the state of devices in the environment, particularly the lock device associated with the lock suggestion model. Thereafter, a candidate generator of the lock suggestion model may generate candidate suggestions and may rank those candidate suggestions based at least in part on the collected data, the trigger event, confidence values associated with the trigger event, and/or other factors associated with the environment and the presence state at issue. Additionally, a guardrail component may be configured to apply one or more rules to ensure that a to-be-sent suggestion is desirable to be sent. For example, the rules may indicate that only one or a given number of suggestions and/or suggestion types are to be sent in a given period of time. The guardrail component may utilize historical use data associated with previously-sent suggestions and/or user feedback data from previously-sent suggestions to determine the one or more rules. Other guardrails may include determining an amount of time from when the presence state transition was detected and determining to only send suggestions once a threshold amount of time has passed from the presence state transition. This may prevent a suggestion from being sent before the user has an opportunity to operate the devices at issue without a suggestion. Other suggestions models, such as a garage door suggestion model and a security system suggestion model, for example, may perform similar processes associated with those devices and/or systems to determine whether a device control suggestion should be sent, and if so what the suggestion should be.

Additionally, an event database may be queried for event data associated with prior presence state transitions to determine whether a suggestion should be sent. For example, while the trigger component may initiate device control suggestions based on the detection of a presence state transition, other events associated with the system may increase or decrease a confidence value associated with the transition and/or otherwise provide indicators of whether certain devices should be operated. For example, when a user leaves an environment the user may provide user input to turn off lights, to set a thermostat to a different temperature, to turn off a television and/or another appliance, to open a garage door, etc. Indicators of these events may be stored in the event database and when those events correspond to a presence state transition from a home state to an away state, those events may be associated with indicators that a device control suggestion should be sent. When event data is utilized as described herein, the event database may receive the event data from one or more domains associated with the system, such as one or more domains associated with speech processing. The domains may include a smart home domain, a music domain, a content-provider domain, etc.

Additionally, a device selector may be configured to select a device associated with the account data to send the suggestion to. For example, given account data may be associated with identifiers of multiple devices. Those devices may include tablet computers, laptop computers, desktop computers, mobile phone devices, earbuds or otherwise headphones, watches and/or other wearable devices, automobiles, televisions, smart home accessory devices, etc. Additionally, when more than one user is associated with an environment, some of the devices may be associated with particular users while other devices may be considered communal devices that are utilized frequently by multiple users. In these and other examples, the device selector may be configured to determine which of the devices associated with account data should be selected for receiving the suggestion. To do so, the device selector may utilize presence data associated with the presence detection and/or historical data associated with user presence to determine the user profile of the user that has left the environment. For example, the presence data may indicate that a device associated with the user, such as a mobile phone, earbuds, automobile, etc., has ceased being detected when the presence state transitioned from a home state to an away state. This may indicate that the user that left the environment took the device at issue with the user. In these examples, this device may be selected as the device to receive the suggestion. In other examples, user identification may be performed based at least in part on the presence data. The user identification may include determining a user profile of the user from speech recognition data, from image-based analysis, from device-based beaconing, etc. In these examples, the user profile of the user may indicate one or more personal devices associated with the user. Those personal devices may be selected for receiving the suggestion. In still other examples, user preferences and/or default rules for receiving suggestions may be utilized. For example, a parent, caretaker, or other individual may be designated to receive device control suggestions, even in examples where the presence state transition did not involve that individual. The device selector may also select the device based at least in part on the type of suggestion. For example, when the suggestion is associated with closing a garage door, the device selector may select an automobile or device associated with an automobile of the user to receive the suggestion.

A suggestion formatter may be configured to determine a format of the suggestion based at least in part on the device selected to receive the suggestion. For example, when a multi-modal devices that includes a display and a speaker is selected, the suggestion formatter may be configured to format the suggestion as text data for presentation of a text suggestion on the display and/or as audio data for output of corresponding audio by the speaker. When the selected device does not include a display, the suggestion formatter may be configured to format the suggestion as audio data. Thereafter, a command generator may be configured to receive the suggestion data and to generate one or more commands that, when received at the selected device, cause the selected device to present the suggestion and/or present an indicator of the suggestion. In some examples, the suggestion may be presented automatically or otherwise without receiving user input to output the suggestion. These types of "barge in" suggestions may be provided based at least in part on the suggestion at issue, user preferences, the type of device selected to receive the suggestion, feedback data, historical use of suggestions, etc. In other examples, the command may be sent to the selected device and may cause the selected device to display an indicator that a suggestion is available. When the user provides user input to output the suggestion, the selected device may cause the suggestion to be output. Once the command is generated as described herein, a notification component of the system may be configured to send the command, including the suggestion data, to the selected device. In examples, determining whether to output the suggestion with or without user input may be based at least in part on the device selected to receive the suggestion. For example, if the selected device is earbuds or headphones, particularly where the state data of that device indicate it is currently outputting audio, the suggestion may be automatically output. Additionally, when the device is an automobile or other device where the user's hands are already likely engaged, the suggestion may be output automatically. In other examples where the user is likely to be able to provide user input, the command may cause the notification of the suggestion to be presented and request user input prior to outputting the suggestion.

The user may then interact with the suggestion by providing user input to accept the suggestion or to disregard the suggestion. For example, the user input may include speech input to a voice interface device, touch input to a graphical user interface, etc. A response handler may receive the user input data and may utilize the user input data to determine whether the user input accepts or rejects the suggestion. When rejected, the system may determine to refrain from operating the device at issue. The system may generate feedback data associated with the user input and may utilize that feedback data to improve determination of suggestions for future use. When accepted, the system may generate directive data to be sent to the device in question, either directly or through an intermediary device such as a voice interface device of the environment. The device may utilize the directive data to operate, such as to close a garage door, arm a security system, lock a door, etc.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for state determination and device control. The system 100 may include, for example, one or more personal devices 102 and one or more target devices 104 (a)-(c), 105. In certain examples, the devices 102, 104 (a)-(c), 105 may be a voice-enabled device (e.g., smart speaker devices, mobile phones, tablets, personal computers, etc.), a video interface device (e.g., televisions, set top boxes, virtual/ augmented reality headsets, etc.), and/or a touch interface device (tablets, phones, laptops, kiosks, billboard, etc.). In examples, the devices 102, 104 (a)-(c), 105 may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, hotel, etc.), for example. The devices 102, 104 (a)-(c), 105 may be configured to send data to and/or receive data from a system 106, such as via a network 108. It should be understood that where operations are described herein as being performed by the system 106, some or all of those operations may be performed by the devices 102, 104 (a)-(c), 105. It should also be understood that anytime the system 106 is referenced, that system may include any system and/or device, whether local to an environment of the devices 102, 104 (a)-(c), 105 or remote from that environment. Additionally, it should be understood that a given space and/or environment may include numerous devices 102, 104 (a)-(c), 105. It should also be understood that when a "space" or "environment" is used herein, those terms mean an area and not necessarily a given room, building, or other structure, unless otherwise specifically described as such. As used here, the devices 104 (a)-(c) are devices having a device type associated with security-related functionality and/or that have been predesignated to not be utilized for determining activity states as described herein. The devices 105 are devices having a different device type that is not necessarily associated with presence detection and/or that have been predesignated to not be utilized for determining activity states as described herein. In examples, various conditions and/or signals may be utilized to determine whether a device should be utilized to detect user presence and/or to be associated with a device control suggestion. For example, the device may be a light switch that can report its state (e.g., on or off) and be manually switched. If the light switch was recently manually switched, then that may be a signal of user presence. If the switch has not been switched for at least a threshold amount of time, say for several hours, then that may be a signal that the device should be considered for a device control suggestion. In other words, device type and/or device usage may be utilized to determine which devices are to be utilized for detecting user presence and for determining activity states of an environment and which device are to be associated with potential device control suggestions.

The personal devices 102, and/or the target devices 104 (a)-(c), 105, may include one or more components, such as, for example, one or more processors 110, one or more network interfaces 112, memory 114, one or more microphones 116, one or more speakers 118, and/or one or more displays 120. The microphones 116 may be configured to capture audio, such as user utterances, and generate corresponding audio data. The speakers 118 may be configured to output audio, such as audio corresponding to audio data received from another device and/or the system 106. The displays 120 may be configured to display images corresponding to image data, such as image data received from the system 106 and/or one or more other devices. The devices 102, 104 (a)-(c), 105 may also include sensors configured to detect an environmental condition associated with the devices 102, 104 (a)-(c), 105 and/or the environment associated with the devices 102, 104 (a)-(c), 105. Some example sensors may include one or more microphones configured to capture audio associated with the environment in which the device is located, one or more cameras configured to capture images associated with the environment in which the device is located, one or more network interfaces configured to identify network access points associated with the environment, global positioning system components configured to identify a geographic location of the devices, Bluetooth and/or other short-range communication components configured to determine what devices are wirelessly connected to the device, device-connection sensors configured to determine what devices are physically connected to the device, user biometric sensors, and/or one or more other sensors configured to detect a physical condition of the device and/or the environment in which the device is situated. In addition to specific environmental conditions that are detectable by the sensors, usage data and/or account data may be utilized to determine if an environmental condition is present.

It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 108 and to communicate with other devices in the system 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The system 106 may include components such as, for example, a speech processing system 122, a user registry 124, a trigger component 126, one or more suggestion models 128, an event database 130, a device selector 132, a command generator 134, a notification component 136, and/or one or more domains 138. It should be understood that while the components of the system 106 are depicted and/or described as separate from each other in FIG. 1, some or all of the components may be a part of the same system. The speech processing system 122 may include an automatic speech recognition component (ASR) 140 and/or a natural language understanding component (NLU) 142. Each of the components described herein with respect to the system 106 may be associated with their own systems, which collectively may be referred to herein as the system 106, and/or some or all of the components may be associated with a single system. Additionally, the system 106 may include one or more applications, which may be described as skills. "Skills," as described herein may be applications and/or may be a subset of an application. For example, a skill may receive data representing an intent. For example, an intent may be determined by the NLU component 142 and/or as determined from user input via a computing device. Skills may be configured to utilize the intent to output data for input to a text-to-speech component, a link or other resource locator for audio data, and/or a command to a device, such as the devices 102, 104 (a)-(c), 105. "Skills" may include applications running on devices, such as the devices 102, 104 (a)-(c), 105, and/or may include portions that interface with voice user interfaces of devices 102, 104 (a)-(c), 105.

In instances where a voice-enabled device is utilized, skills may extend the functionality of devices 102, 104 (a)-(c), 105 that can be controlled by users utilizing a voice-user interface. In some examples, skills may be a type of application that may be useable in association with target devices 104 (a)-(c), 105 and may have been developed specifically to work in connection with given target devices 104 (a)-(c), 105. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

The components of the personal devices 102, the target devices 104 (a)-(c), 105, and the system 106 are described in detail below. In examples, some or each of the components of the system 106 may include their own processor(s), network interface(s), and/or memory. As such, by way of example, the speech processing system 122 may include and/or be associated with processor(s), network interface(s), and/or memory. The other components of the system 106, such as the one or more suggestion models 128, may include and/or be associated with different processor(s), network interface(s), and/or memory, or one or more of these components may utilize some or all of the same processor(s), network interface(s), and/or memory utilized by the speech processing system 122. These components are described in detail below. Additionally, the operations and/or functionalities associated with and/or described with respect to the components of the system 106 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the system 106, the user registry 124 may be configured to determine and/or generate associations between users, user accounts, environment identifiers, and/or devices. For example, one or more associations between user accounts may be identified, determined, and/or generated by the user registry 124. The user registry 124 may additionally store information indicating one or more applications and/or resources accessible to and/or enabled for a given user account. Additionally, the user registry 124 may include information indicating device identifiers, such as naming identifiers, associated with a given user account, as well as device types associated with the device identifiers. The user registry 124 may also include information indicating user account identifiers, naming indicators of devices associated with user accounts, and/or associations between devices, such as the devices 102, 104 (a)-(c), 105. The user registry 124 may also include information associated with usage of the devices 102, 104 (a)-(c), 105. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system 122 may be configured to receive audio data from the personal devices 102 and/or other devices and perform speech-processing operations. For example, the ASR component 140 may be configured to generate text data corresponding to the audio data, and the NLU component 142 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "order ice cream," the NLU component 142 may identify a "order" intent and the payload may be "ice cream." In this example where the intent data indicates an intent to purchase ice cream to be delivered to an environment, the speech processing system 122 may call one or more speechlets to effectuate the intent. Speechlets, as described herein may otherwise be described as applications and may include functionality for utilizing intent data to generate directives and/or instructions. For example, a speechlet associated ordering food may be called. The speechlet may be designated as being configured to handle the intent of ordering food, for example. The speechlet may receive the intent data and/or other data associated with the user utterance from the NLU component 142, such as by an orchestrator of the system 106, and may perform operations to place an order for ice cream to be delivered to a given environment, for example. The system 106 may generate audio data confirming that the order has been placed, such as by a text-to-speech component. The audio data may be sent from the system 106 to one or more of the personal devices 102.

The components of the system 100 are described below by way of example. For example, the trigger component 126 may be configured to detect one or more trigger events for providing a device control suggestion to a user device 102. For example, the trigger component 126 may detect changes in user presence states associated with a given environment. To illustrate, a user may move from outside an environment, such as a home for example, to within the environment. While the user is within the environment, the trigger component 126 or another component of the system 106 may detect the user's presence through one or more methodologies described in more detail with respect to FIGS. 11 and 12. For example, acoustic event detection techniques may be utilized to detect sounds within the environment that are indicative of user presence, such as talking, footsteps, the use of appliances, etc. Additionally, or alternatively, when approved to do so by user account data, image data associated with the environment may be processed to determine that an object in the environment is a user and/or that an object is moving such that presence is indicated. Additionally, or alternatively, device data such as the detection of a user personal device within the environment and/or movement of the user personal device may indicate presence. Additionally, or alternatively, state data indicating the changing of device states for devices of the environment may indicate that a user is present in the environment. These and other examples for detecting user presence and the transition of user presence associated with an environment are described in more detail below. For example, the trigger component 126 may detect changes in user presence states associated with a given environment. To illustrate, a user may move from outside an environment, such as a home for example, to within the environment. While the user is within the environment, the trigger component 126 or another component of the system 106 may detect the user's presence through one or more methodologies described in more detail with respect to FIGS. 11 and 12. For example, acoustic event detection techniques may be utilized to detect sounds within the environment that are indicative of user presence, such as talking, footsteps, the use of appliances, etc. Additionally, or alternatively, when approved to do so by user account data, image data associated with the environment may be processed to determine that an object in the environment is a user and/or that an object is moving such that presence is indicated. Additionally, or alternatively, device data such as the detection of a user personal device within the environment and/or movement of the user personal device may indicate presence. Additionally, or alternatively, state data indicating the changing of device states for devices of the environment may indicate that a user is present in the environment. These and other examples for detecting user presence and the transition of user presence associated with an environment are described in more detail below.

The trigger component 126 may receive an indication of an activity state transition from one or more activity models 139. The activity models 139 may include one or more activity models 139 for each profile (whether personal, household, or other type of user profile), which are configured to accept event data and generate, as output, results indicating that given event data suggests a given user's activity state and, in examples, a confidence value associated with the activity state determination. The activity models 139 may include a historical-activity model, which may be configured to determine an activity state associated with historical events associated with a device and/or environment. For example, the historical-activity model may be configured to accept, as features to the historical-activity model, event data corresponding to historical events. The historical-activity model may generate, as output, data indicating that a given historical event corresponded to a given activity state. For example, the historical-activity model may be utilized to determine that a given time a week prior to making the determination that a given environment was associated with an asleep state, for example, based at least in part on the event data associated with that given time.

The activity models 139 may also include a current-activity model 139, which may be configured to determine an activity state associated with recent events associated with a user profile and/or environment. For example, recent events may include events that are currently occurring, such as receipt of audio data indicating presence, and/or receipt of an indication that a device was just operated. In examples, use of the current-activity model may be in association with a given device and/or a system causing one or more sensors or other components of the device to generate data indicating recent events to be utilized by the current-activity model. The current-activity model may generate, as output, data indicating that a given event corresponds to a given activity state. For example, the current-activity model may be utilized to determine that at a current time a given environment is associated with an active state based at least in part on event data associated with the current time. In examples, the current-activity model may be trained based at least in part on the output from the historical-activity model.

The activity models 139 may also include a future-activity model, which may be configured to predict an activity state associated with events that may occur in the future with respect to an electronic device and/or environment. For example, the future-activity model may be configured to accept, as input features, event data corresponding to the historical events and/or live or near-live events. The future-activity model may generate, as output, data indicating that a given event that is likely to occur at a particular time in the future and/or is likely to correspond to a given activity state. For example, the future-activity model may be utilized to determine that at a given time a week from when the determination is made a given environment is likely to be associated with an away state, for example, based at least in part on historical event data and/or current event data associated with the given environment. In examples, the future-activity model may be trained based at least in part on the output from the historical-activity model and/or the current-activity model. For example, the output of the historical-activity model may include determinations of activity state at past times, while output of the current-activity model may include determinations of activity state at a current time. These activity state determinations may be utilized to train the future-activity model, such as by providing indications of activity state at given times of day and/or days of the week.

The activity models 139 may be made available to one or more applications associated with the remote system and/or one or more other systems. For example, one or more applications may be able to utilize activity state determinations to generate more accurate results and/or to determine when to perform certain operations, such as when to generate and/or send a recommendation and/or other type of notification, when to operate a device (e.g., when to transition a state of a device), etc. Example recommendations and/or device-control suggestions are described in detail below:

When determining the activity states, event labeling may be performed. For example, if a user activates a feature of a smart home system, one or more machine learning models may be generated and be configured to accept the event data associated with a particular user account. Training algorithms may perform an analysis of the event data, including labelling the event data with one or more indicators of an activity state. For example, the training models may include a supervised machine learning model that has been configured to apply one or more rules to given events to label those events with an activity state. For example, event data indicating that a light has been turned on may be labeled by the supervised machine learning model as being associated with an active state, as opposed to an inactive state (e.g., asleep or away).

It should be understood that, in examples, an inactive state may include an away state and/or an asleep state. In an away state, presence of a user may not be detected in an environment associated with one or more sensors configured to detect presence. In an asleep state, presence of the user may be detected, but the user may not be moving or may otherwise not be interacting with the environment, such as by providing commands for devices to perform operations. This is in contrast to an active state, where presence of the user is detected and the user is moving or otherwise is interacting with the environment, such as by walking, talking, changing positions, and/or giving commands, for example. The system may determine that user profile data is associated with an active state when one or more signals, such as from smart-home devices or otherwise accessory devices, are received that indicate that a user associated with the user profile data is present and is engaged in an activity in the environment. The one or more signals may include, for example, device-beacon data received from a user device associated with the user that indicates the device is in the environment and that the device is moving. The one or more signals may also include, for example, data indicating interaction of the user with a voice user interface, such as a voice user interface associated with a voice-enabled device. The one or more signals may also include, for example, data indicating that a wake word has been detected, such as by a voice-enabled device. The one or more signals may also include, for example, receipt of user input data requesting operation of a device in the environment. The one or more signals may also include, for example, data indicating that a smart-home device is being operated and/or that another device is being operated and a smart-home device or other device having sensors described herein has detected operation of the smart-home device. Such operations may include, for example, turning lights on and/or off, turning appliances on and/or off from the appliances themselves as opposed to from an application running on a mobile user device, a wireless router device or other network access point receiving data indicating a SSID of a personal device of a user and an indication that such a device is sending data, motion sensor data, ambient noise detection, acoustic event detections, ambient light determinations, force value detections from devices such as smart beds, etc.

Additionally, for the inactive states, such as the away state or the asleep state, the one or more signals may include the same or similar signals as described above, but where those signals indicate that users are absent from the environment, or that users are present but are asleep. For example, when no device-beaconing data is received, such an occurrence indicates that no mobile personal devices are within the environment, which may be utilized to determine that user profile data is associated with an away mode. Other examples where the signals indicate that user profile data is associated with an away mode include ambient noise satisfying a threshold noise value indicating an environment is emitting only typical ambient background noise. Other indications may include the lack of interaction with smart-home devices, such as for at least a threshold period of time. The one or more signals may also indicate an asleep state in instances where the signals indicate that a user is present, such as from device-beaconing data, but the signals otherwise indicate an inactive state, such as from data indicating a lack of interaction with smart-home devices, a lack of acoustic event detection for events such as footsteps, the lack of detection of user speech from audio data captured by a microphone in the environment, etc. Additionally, the one or more sensors may be configured to detect noises and/or posture indicating an asleep state. For example, breathing and/or snoring may be audible and may be detected from audio data captured from the environment. In further examples, radar-based sensors, such as ultrasonic sensors, may be configured to determine, when user consent has been provided to collect such data, a location of a user, which may indicate that a user is in a sleeping position. Additionally, in examples where the sensors are included in a smart bed, or other object associated with sleeping, signals from those sensors, such as an indication that someone is on the bed, may be utilized. Additionally, contextual data such as the time of day, day of the week, and/or historical data indicating when user profile data is associated with an asleep state may be utilized. For example, it may be more likely that user profile data is associated with an asleep state during the nighttime, such as on a weeknight. Some or all of this information may be utilized to determine that user profile data is associated with an asleep state.

The activity models 139 may also be configured to select which data from the various devices is to be used and what data is specifically not to be used. For example, device state data from certain devices, particularly security-related devices, may indicate activity states, but may not be used in the event that such data would result in an inaccurate prediction of activity state. For example, a door lock device may indicate that a door is currently unlocked. Such a signal may indicate that a user is present in the environment, even when other data indicates the user has moved away from the environment. Similarly, a garage door opening device may indicate that a garage door is open and thus that a user is potentially present even if the user has left the environment but forgot to close the garage door. Likewise, a security system may be in a disarmed state indicating the user is present, but again the user may have just forgotten to arm the security system. In these and other examples, the device type of the devices at issue may be utilized to determine which device data to utilize for activity state prediction. In examples, data from device types associated with security-related functionality, such as door locks, security systems, garage doors, window sensors, door sensors, motion sensors, etc. may not be utilized or may be given limited weight when determine activity states of the system at issue.

The trigger component 126 noted above may determine that the activity state of the environment changes from a first activity state to a second activity state. For example, the first activity state may be associated with detection of user presence in the environment. The second activity state may be associated with ceasing detection of user presence in the environment and/or detecting that a user is moving away from an environment but that the user has not yet left the environment. When these or other trigger events are detected, the system may query one or more suggestion models 128 to determine whether a device control suggestion should be sent, and if so, what the suggestion should be. For example, given the activity state transition, the devices that were purposefully not used to determine the activity state may be queried for their device states to determine whether those device states are associated with the current activity state. In examples, the suggestion models 128 may each be configured to determine a suggestion for a given device and/or device type. For example, a first suggestion model may be configured to determine whether a suggestion should be sent to operate a smart lock, a second suggestion model may be configured to determine whether a suggestion should be sent to operate a garage door, a third suggestion model may be configured to determine whether a suggestion should be sent to operate a security system, etc. Each of these models may run in parallel when a given trigger event is detected by the trigger component 126.

To illustrate utilizing the three suggestion models 128 highlighted above as an example, the lock suggestion model 128 may determine whether the account data associated with the environment at issue indicates that device control suggestions are eligible to be sent. For example, the account data may indicate whether user preferences have been set up and indicate that suggestions are enabled. The account data may also indicate whether the environment includes a device 104 (*a*)-(*c*) with a device type associated with the suggestion model 128 and/or whether the account data indicates that the user has a personal user device 102 to send data representing the suggestion to. When the account data indicates that the device control suggestion is eligible to be sent, data associated with the devices at issue, the environment, and/or the trigger event may be received. This data may include indicators of the state of devices 102, 104 (*a*)-(*c*), 105 in the environment, particularly the lock device 104 (*a*) associated with the lock suggestion model. Thereafter, a candidate generator of the lock suggestion model 128 may generate candidate suggestions and may rank those candidate suggestions based at least in part on the collected data, the trigger event, confidence values associated with the trigger event, and/or other factors associated with the environment and the presence state at issue. Additionally, a guardrail component may be configured to apply one or more rules to ensure that a to-be-sent suggestion is desirable to be sent. For example, the rules may indicate that only one or a given number of suggestions and/or suggestion types are to be sent in a given period of time. The guardrail component may utilize historical use data associated with previously-sent suggestions and/or user feedback data from previously-sent suggestions to determine the one or more rules. Other guardrails may include determining an amount of time from when the presence state transition was detected and determining to only send suggestions once a threshold amount of time has passed. This may prevent a suggestion from being sent before the user has an opportunity to operate the devices at issue without a suggestion. Other suggestions models 128, such as a garage door suggestion model and a security system suggestion model, for example, may perform similar processes associated with those devices and/or systems to determine whether a device control suggestion should be sent, and if so what the suggestion should be.

Additionally, the event database 130 may be queried for event data associated with prior presence state transitions to determine whether a suggestion should be sent. For example, while the trigger component 126 may initiate device control suggestions based on the detection of a presence state transition, other events associated with the system may increase or decrease a confidence value associated with the transition and/or otherwise provide indicators of whether the devices at issue should be operated. For example, when a user leaves an environment the user may provide user input to turn off lights, to set a thermostat to a different temperature, to turn off a television and/or another appliance, to open a garage door, etc. Indicators of these events may be stored in the event database 130 and when those events correspond to a presence state transition from a home state to an away state, those events may be associated with indicators that a device control suggestion should be sent. When event data is utilized as described herein, the event database 130 may receive the event data from one or more of the domains 138 associated with the system, such as one or more domains 138 associated with speech processing. The domains 130 may include a smart home domain, a music domain, a content-provider domain, etc.

Additionally, the device selector 132 may be configured to select a device 102 associated with the account data to send the suggestion to. For example, given account data may be associated with identifiers of multiple devices 102. Those devices 102 may include tablet computers, laptop computers, desktop computers, mobile phone devices, earbuds or otherwise headphones, watches and/or other wearable devices, automobiles, televisions, smart home accessory devices, etc. Additionally, when more than one user is associated with an environment, some of the devices 102 may be associated with particular users while other devices 102 may be considered communal devices that are utilized frequently by multiple users. In these and other examples, the device selector 132 may be configured to determine which of the devices 102 associated with account data should be selected for receiving the suggestion. To do so, the device selector 132 may utilize presence data associated with the presence detection and/or historical data associated with user presence to determine the user profile of the user that has left the environment. For example, the presence data may indicate that a device 102 associated with the user, such as a mobile phone, earbuds, automobile, etc., has ceased being detected when the presence state transitioned from a home state to an away state. This may indicate that the user that left the environment took the device 102 at issue with the user. In these examples, this device 102 may be selected as the device 102 to receive the suggestion. In other examples, user identification may be performed based at least in part on the presence data. The user identification may include determining a user profile of the user from speech recognition data, from image-based analysis, from device-based beaconing, etc. In these examples, the user profile of the user may indicate one or more personal devices 102 associated with the user. Those personal devices 102 may be selected for receiving the suggestion. In still other examples, user preferences and/or default rules for receiving suggestions may be utilized. For example, a parent, caretaker, or other individual may be designated to receive device control suggestions, even in examples where the presence state transition did not involve that individual. The device selector 132 may also select the device 102 based at least in part on the type of suggestion. For example, when the suggestion is associated with closing a garage door, the device selector 132 may select an automobile or device associated with an automobile of the user to receive the suggestion.

A suggestion formatter may be configured to determine a format of the suggestion based at least in part on the device selected to receive the suggestion. For example, when a multi-modal device 102 that includes a display 120 and a speaker 118 is selected, the suggestion formatter may be configured to format the suggestion as text data for presentation of a text suggestion on the display 120 and/or as audio data for output of corresponding audio by the speaker 118. When the selected device 102 does not include a display 120, the suggestion formatter may be configured to format the suggestion as audio data. Thereafter, the command generator 134 may be configured to receive the suggestion data and to generate one or more commands that, when received at the selected device 102, cause the selected device 102 to present the suggestion and/or present an indicator of the suggestion. For example, in some examples the suggestion may be presented automatically or otherwise without receiving user input to output the suggestion. These types of "barge in" suggestions may be provided based at least in part on the suggestion at issue, user preferences, the type of device selected to receive the suggestion, feedback data, historical use of suggestions, etc. In other examples, the command may be sent to the selected device 102 and may cause the selected device to display an indicator that a suggestion is available. When the user provides user input to output the suggestion, the selected device may cause the suggestion to be output. Once the command is generated as described herein, the notification component 136 may be configured to send the command, including the suggestion data, to the selected device 102. In examples, determining whether to output the suggestion with or without user input may be based at least in part on the device selected to receive the suggestion. For example, if the selected device 102 is earbuds or headphones, particularly where the state data of that device 102 indicates it is currently outputting audio, the suggestion may be automatically output. Additionally, when the device 102 is an automobile or other device where the user's hands are already likely engaged, the suggestion may be output automatically. In other examples where the user is likely to be able to provide user input, the command may cause the notification of the suggestion to be presented and request user input prior to outputting the suggestion.

The user may then interact with the suggestion by providing user input to accept the suggestion or to disregard the suggestion. For example, the user input may include speech input to a voice interface device, touch input to a graphical user interface, etc. A response handler may receive the user input data and may utilize the user input data to determine whether the user input accepts or rejects the suggestion. When rejected, the system may determine to refrain from operating the device at issue. The system may generate feedback data associated with the user input and may utilize that feedback data to improve determination of suggestions for future use. When accepted, the system may generate directive data to be sent to the target device 104 (a)-(c) in question, either directly or through an intermediary device such as a voice interface device of the environment. The target device 104 (a)-(c) may utilize the directive data to operate, such as to close a garage door, arm a security system, lock a door, etc.

As used herein, the one or more suggestion models 128 and/or the components responsible for detecting user presence may be machine learning models. For example, the machine learning models as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

As described herein, the machine learning models may be configured to be trained utilizing a training dataset associated with the presence detections and target device usage data. The models may be trained for multiple user accounts and/or for a specific user account. As such, the machine learning models may be configured to learn, without human intervention, attributes of collected sensor data and/or detected presence events that are more likely and/or less likely to be associated with target device usage.

It should be noted that while text data is described as a type of data utilized to communicate between various components of the system 106 and/or other systems and/or devices, the components of the system 106 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102, 104 (a)-(c), 105.

As shown in FIG. 1, several of the components of the system 106 and the associated functionality of those components as described herein may be performed by one or more of the devices 102, 104 (*a*)-(*c*), 105. Additionally, or alternatively, some or all of the components and/or functionalities associated with the devices 102, 104 (*a*)-(*c*), 105 may be performed by the system 106.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 110 and/or the processor(s) described with respect to the components of the system 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110 and/or the processor(s) described with respect to the components of the system 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110 and/or the processor(s) described with respect to the components of the system 106 may possess its own local memory, which also may store program components, program data, and/or one or more operating systems.

The memory 114 and/or the memory described with respect to the components of the system 106 may include volatile and nonvolatile memory, removable and non-removable media implemented in any method or technology for storage of information, such as computer-readable instructions, data structures, program component, or other data. Such memory 114 and/or the memory described with respect to the components of the system 106 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114 and/or the memory described with respect to the components of the system 106 may be implemented as computer-readable storage media ("CRSM"), which may be any available physical media accessible by the processor(s) 110 and/or the processor(s) described with respect to the system 106 to execute instructions stored on the memory 114 and/or the memory described with respect to the components of the system 106. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114 and/or the memory described with respect to the components of the system 106, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project: other UNIX or UNIX-like variants: a variation of the Linux operating system as promulgated by Linus Torvalds: the FireOS operating system from Amazon.com Inc. of Seattle, Washington, USA: the Windows operating system from Microsoft Corporation of Redmond, Washington, USA: LynxOS as promulgated by Lynx Software Technologies, Inc. of San Jose, California: Operating System Embedded (Enea OSE) as promulgated by ENEA AB of Sweden; and so forth.

The network interface(s) 112 and/or the network interface(s) described with respect to the components of the system 106 may enable messages between the components and/or devices shown in system 100 and/or with one or more other polling systems, as well as other networked devices. Such network interface(s) 112 and/or the network interface(s) described with respect to the components of the system 106 may include one or more network interface controllers (NICs) or other types of transceiver devices to send and receive messages over the network 108.

For instance, each of the network interface(s) 112 and/or the network interface(s) described with respect to the components of the system 106 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 112 and/or the network interface(s) described with respect to the components of the system 106 may include a wide area network (WAN) component to enable message over a wide area network.

In some instances, the system 106 may be local to an environment associated the devices 102 (*a*)-(*d*), 104, 105. For instance, the system 106 may be located within one or more of the devices 102 (*a*)-(*d*), 104, 105. In some instances, some or all of the functionality of the system 106 may be performed by one or more of the devices 102 (*a*)-(*d*), 104, 105. Also, while various components of the system 106 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device and/or edge server in a home and/or office environment, a self-driving automobile, a bus, an airplane, a camper, a trailer, and/or other similar object having a computer to perform its own sensor processing, etc.

Figure 2:
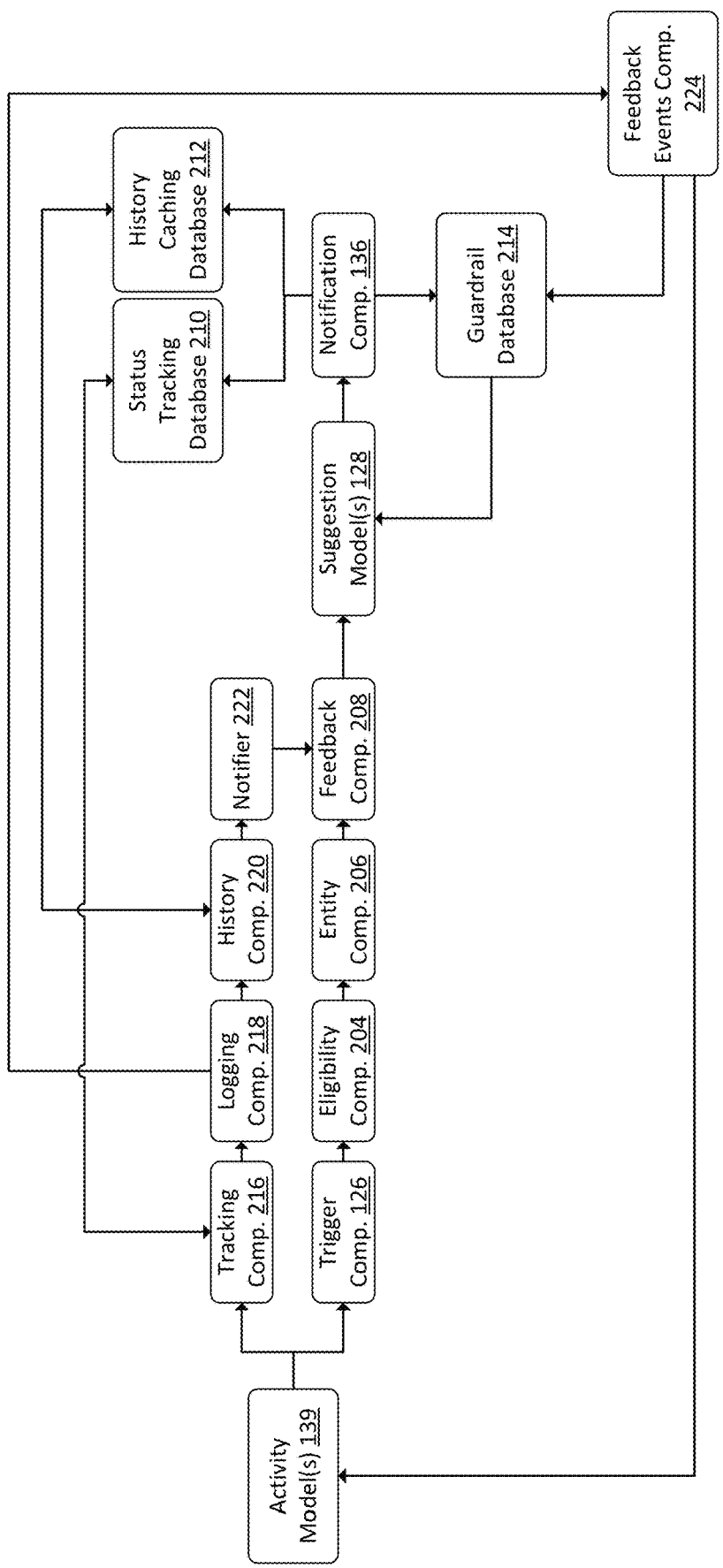
FIG. 2 illustrates a conceptual diagram of example components utilized for state determination and device control.

FIG. 2 illustrates a conceptual diagram of example components utilized for state determination and device control. The components of FIG. 2 may be the same or similar to those of FIG. 1. For example, FIG. 2 includes a trigger component 126, one or more suggestion models 128, a notification component 136, and/or one or more activity models 139. FIG. 2 also includes an eligibility component 204, an entity component 206, a feedback component 208, a status tracking database 210, a history caching database 212, a guardrail database 214, a tracking component 216, a logging component 218, a history component 220, a notifier 222, and/or feedback events component 224. Each of the components of FIG. 2 will be described below by way of example.

To start, the activity model(s) 139 may be configured to detect user presence and/or transitions of presence states. For example, acoustic event detection techniques may be utilized to detect sounds within the environment that are indicative of user presence, such as talking, footsteps, the use of appliances, etc. Additionally, or alternatively, when approved to do so by user account data, image data associated with the environment may be processed to determine that an object in the environment is a user and/or that an object is moving such that presence is indicated. Additionally, or alternatively, device data such as the detection of a user personal device within the environment and/or movement of the user personal device may indicate presence. Additionally, or alternatively, state data indicating the changing of device states for devices of the environment may indicate that a user is present in the environment. These and other examples for detecting user presence and the transition of user presence associated with an environment are described in more detail below.

Indicators of the presence states and presence state transitions may be sent from the activity model(s) 139 to the trigger component 126 and/or the tracking component 216. The trigger component 126 may determine which of the presence states and/or presence state transitions are trigger events for purposes of sending a security-based device control suggestion. For example, a trigger event may include a transition from a home state to an away state, and/or a transition from an unknown state to an away state, and/or determining that the presence state indicates the user is moving away from the environment, etc. When these or other trigger events are detected, the system 106 may query one or more of the suggestion models 128 to determine whether a device control suggestion should be sent, and if so, what the suggestion should be.

Prior to querying the suggestion models 128, the eligibility component 204 may be configured to determine whether the account data associated with the environment at issue indicates that device control suggestions are eligible to be sent. For example, the account data may indicate whether user preferences have been set up and indicate that suggestions are enabled. The account data may also indicate whether the environment includes a device with a device type associated with the suggestion model 128 and/or whether the account data indicates that the user has a personal user device to send data representing the suggestion to. When the account data indicates that the device control suggestion is eligible to be sent, the entity component 206 may determine whether the devices at issue are configured to receive suggestions and/or whether the target devices may be acted on if a suggestion is accepted by the user. The feedback component 208 may be configured to determine whether feedback data indicates that a suggestion should be sent and/or details about which devices, account data, etc. should be utilized in association with the suggestion.

Thereafter, the resulting data from the eligibility component 204, the entity component 206, and/or the feedback component 208 may be sent to the one or more suggestion models 128. Additionally, data from the guardrail database 214 may be received and utilized to apply one or more rules to ensure that a to-be-sent suggestion is desirable to be sent. For example, the rules may indicate that only one or a given number of suggestions and/or suggestion types are to be sent in a given period of time. The guardrail component may utilize historical use data associated with previously-sent suggestions and/or user feedback data from previously-sent suggestions to determine the one or more rules. Other guardrails may include determining an amount of time from when the presence state transition was detected and determining to only send suggestions once a threshold amount of time has passed. This may prevent a suggestion from being sent before the user has an opportunity to operate the devices at issue without a suggestion. The suggestion models 128 may be configured to generate one or more suggestions as described herein, and data representing the suggestions and/or commands associated with the suggestions may be provided to the notification component 136. The notification component 136 may be configured to send the command and/or data representing the suggestion to a selected device.

Additionally, the status tracking database 210 may store data indicating the status of various suggestions associated with the account data as well as the status of the target devices at issue. This information may be utilized by the system to determine whether subsequent suggestions should be sent and/or how subsequent suggestions should be sent. The history caching database 212 may be configured to store data indicating prior user interactions with suggestions, such as which suggestions were accepted and/or which suggestions were rejected. This historical data may be utilized to inform whether subsequent suggestions should be sent and/or how subsequent suggestions should be sent.

For example, the tracking component 216 of the system may be configured to receive the status tracking data from the status tracking database 210 and utilize that data to determine what suggestions have already been sent to the user and how those suggestions were sent. Additionally, the logging component 218 may be configured to log the status changes of the suggestions and/or target devices acted on from suggestions and to send feedback data to the feedback events component 224. This feedback data may be queried by the activity models 129 and/or the guardrail database 214 to improve detection of presence states and/or to improve the rules utilized in association with the guardrail database 214. The history component 220 may be configured to utilize the data from the history caching database 212 to determine which events are associated with accepted security-based device control suggestions. For example, while the trigger component 126 may initiate device control suggestions based on the detection of a presence state transition, other events associated with the system may increase or decrease a confidence value associated with the transition and/or otherwise provide indicators of whether the devices at issue should be operated. For example, when a user leaves an environment the user may provide user input to turn off lights, to set a thermostat to a different temperature, to turn off a television and/or another appliance, to open a garage door, etc. Indicators of these events may be stored and when those events correspond to a presence state transition from a home state to an away state, those events may be associated with indicators that a device control suggestion should be sent. When event data is utilized as described herein, history component 220 may receive the event data from one or more of domains associated with the system, such as one or more domains associated with speech processing. The domains may include a smart home domain, a music domain, a content-provider domain, etc. When the processes associated with the tracking component 216, the logging component 218, and/or the history component 220 indicate it is desirable to send a suggestion, the notifier 222 may provide an indication of the suggestion desirability to the feedback component 208. In other examples, the notifier 222 may provide an indication that sending a suggestion is not desirable, such as based on the historical data, the status tracking data, etc. In these examples, feedback component 208 may determine to refrain from requesting a suggestion from the suggestion model(s) 128.

Figure 3:
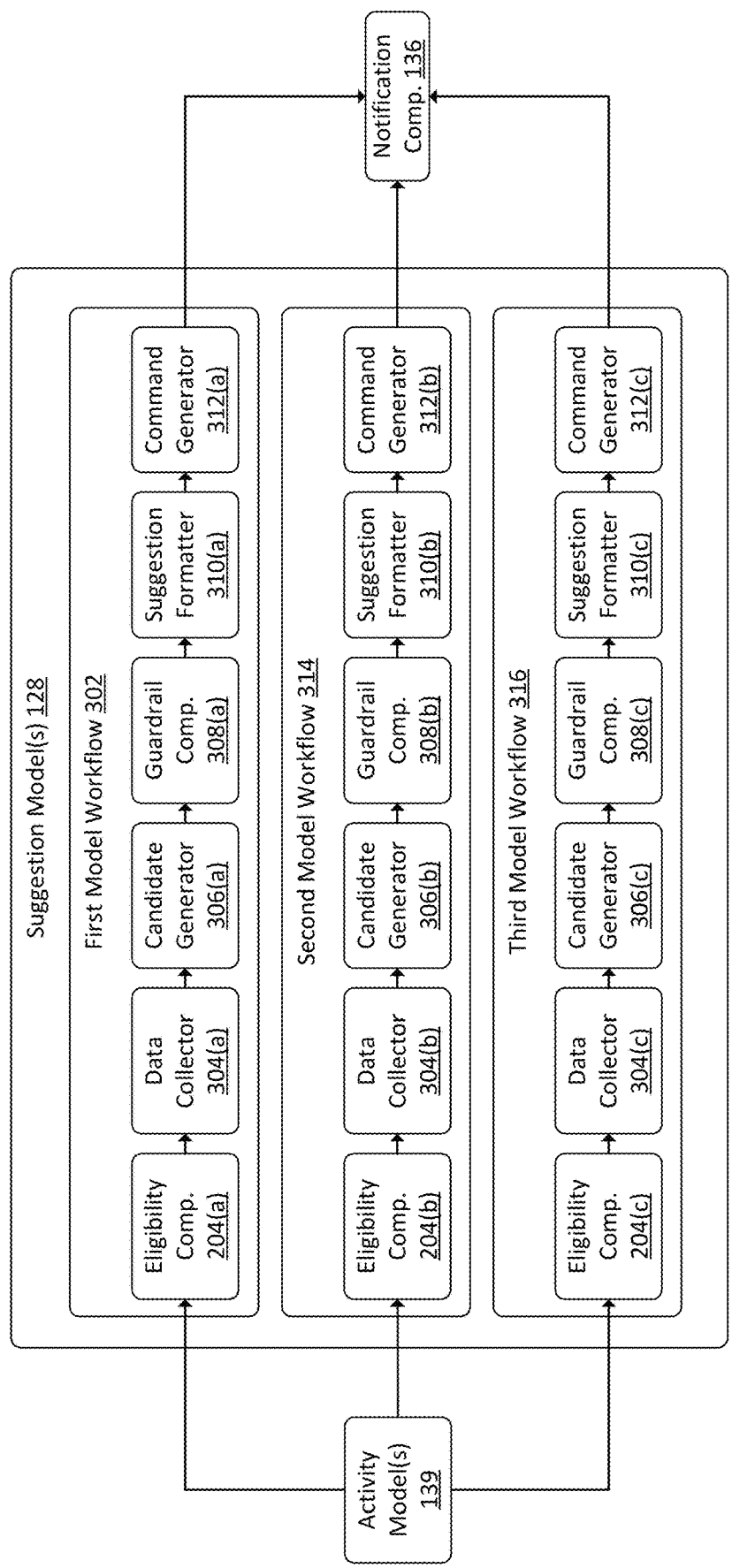
FIG. 3 illustrates a conceptual diagram of example components utilized for performing parallel workflows associated with state determination and device control.

FIG. 3 illustrates a conceptual diagram of example components utilized for performing parallel workflows associated with state determination and device control. The components of FIG. 3 may be the same or similar to those discussed with respect to FIG. 1 and/or FIG. 2. For example, FIG. 3 includes one or more activity models 139, one or more suggestion models 128, and/or a notification component 136. FIG. 3 also includes eligibility components 204 (a)-(c) that correspond to the eligibility component 204 from FIG. 2. FIG. 3 also includes a first model workflow 302, data collectors 304 (a)-(c), candidate generators 306 (a)-(c), guardrail components 308 (a)-(c), suggestion formatters 310 (a)-(c), command generators 312 (a)-(c), a second model workflow 314, and/or a third model workflow 316. Each of these components of FIG. 3 will be described in detail below by way of example.

To illustrate, the first model workflow 302 may include the eligibility component 204 (a) determine whether the account data associated with the environment at issue indicates that device control suggestions are eligible to be sent. For example, the account data may indicate whether user preferences have been set up and indicate that suggestions are enabled. The account data may also indicate whether the environment includes a device with a device type associated with the suggestion model 128 and/or whether the account data indicates that the user has a personal user device to send data representing the suggestion to. When the account data indicates that the device control suggestion is eligible to be sent, data associated with the devices at issue, the environment, and/or the trigger event may be received at the data collector 304 (a). This data may include indicators of the state of devices in the environment. Thereafter, the candidate generator 306 (a) may generate candidate suggestions and may rank those candidate suggestions based at least in part on the collected data, the trigger event, confidence values associated with the trigger event, and/or other factors associated with the environment and the presence state at issue. Additionally, the guardrail component 308 may be configured to apply one or more rules to ensure that a to-be-sent suggestion is desirable to be sent. For example, the rules may indicate that only one or a given number of suggestions and/or suggestion types are to be sent in a given period of time. The guardrail component may utilize historical use data associated with previously-sent suggestions and/or user feedback data from previously-sent suggestions to determine the one or more rules. Other guardrails may include determining an amount of time from when the presence state transition was detected and determining to only send suggestions once a threshold amount of time has passed. This may prevent a suggestion from being sent before the user has an opportunity to operate the devices at issue without a suggestion.

The suggestion formatter 310 (a) may be configured to determine a format of the suggestion based at least in part on the device selected to receive the suggestion. For example, when a multi-modal device that includes a display and a speaker is selected, the suggestion formatter may be configured to format the suggestion as text data for presentation of a text suggestion on the display and/or as audio data for output of corresponding audio by the speaker. When the selected device does not include a display, the suggestion formatter may be configured to format the suggestion as audio data. Thereafter, the command generator 312 (a) may be configured to receive the suggestion data and to generate one or more commands that, when received at the selected device, cause the selected device to present the suggestion and/or present an indicator of the suggestion. The command generator 312 (a) may also be configured to acquire data for generating an explanation associated with the suggestion. For example, instead of the suggestion requesting only that a door lock be engaged, the command generator 312 (a) may generate an explanation for the suggestion, such as an indication that the system has detected that the user is leaving and that is why the suggestion is being surfaced, or that the user has open and then closed a garage door, etc.

In examples, in some examples the suggestion may be presented automatically or otherwise without receiving user input to output the suggestion. These types of "barge in" suggestions may be provided based at least in part on the suggestion at issue, user preferences, the type of device selected to receive the suggestion, feedback data, historical use of suggestions, etc. In other examples, the command may be sent, via the notification component 136, to the selected device and may cause the selected device to display an indicator that a suggestion is available. When the user provides user input to output the suggestion, the selected device may cause the suggestion to be output. Once the command is generated as described herein, the notification component 136 may be configured to send the command, including the suggestion data, to the selected device. In examples, determining whether to output the suggestion with or without user input may be based at least in part on the device selected to receive the suggestion. For example, if the selected device is earbuds or headphones, particularly where the state data of that device indicates it is currently outputting audio, the suggestion may be automatically output. Additionally, when the device 102 is an automobile or other device where the user's hands are already likely engaged, the suggestion may be output automatically. In other examples where the user is likely to be able to provide user input, the command may cause the notification of the suggestion to be presented and request user input prior to outputting the suggestion.

As shown in FIG. 3, three model workflows 302, 314, and 316 are being performed. These workflows may be performed in parallel and may utilize one or more of the components of the suggestion models 128 in parallel. As such, the individual components of the workflows may be different components across workflows and/or some or all of the components may be shared by the workflows. In this example, more than one suggestion may be generated by the various workflows and suggestion arbitration may be performed, which is described in more detail with respect to FIG. 4. It should be understood that while three workflows are shown in FIG. 3, this disclosure includes the use of one, two, three, or more workflows, all of which may be performed in parallel with each other.

Figure 4:
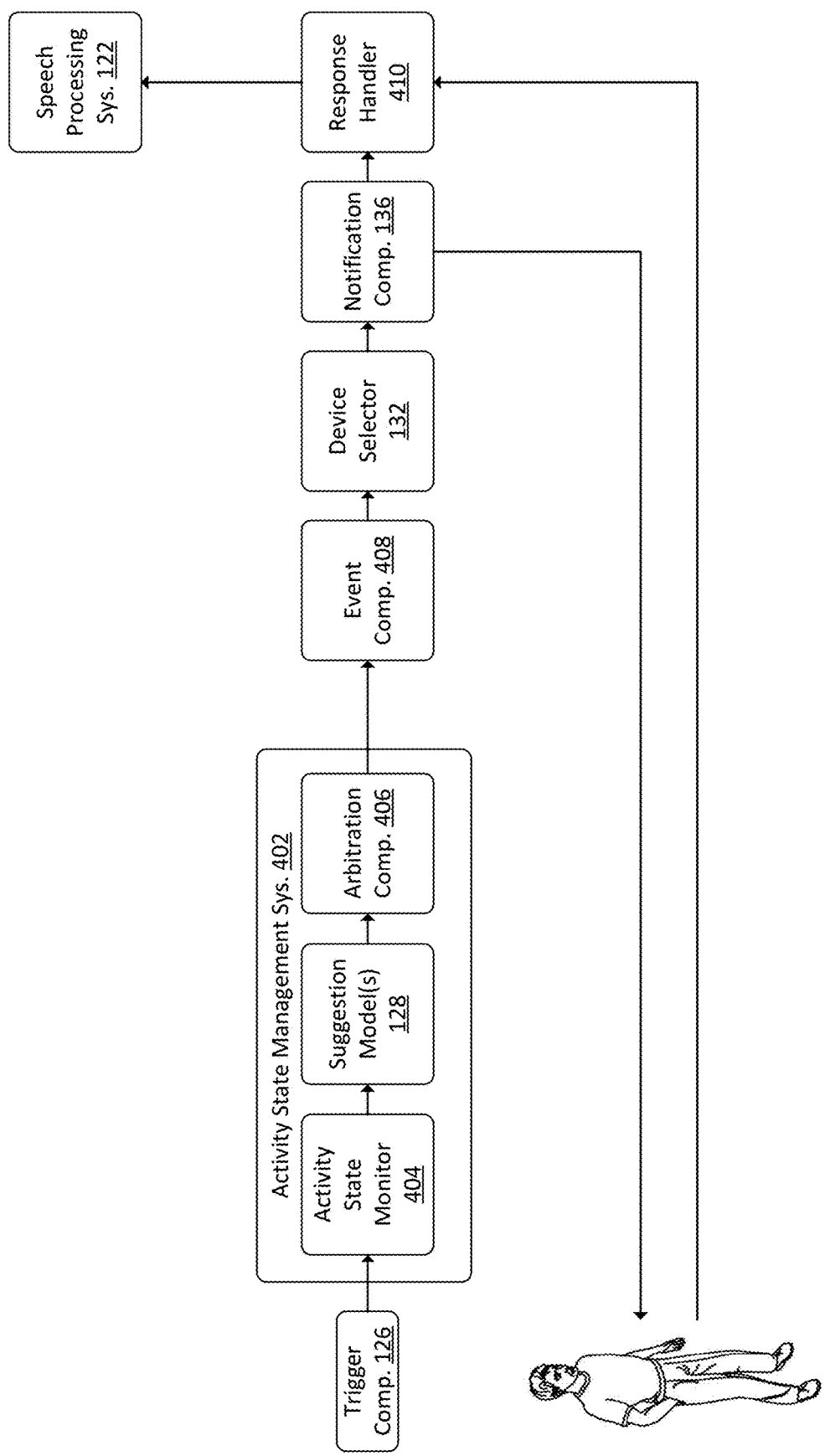
FIG. 4 illustrates a conceptual diagram of example components utilized for arbitrating device suggestions and handling user responses thereto.

FIG. 4 illustrates a conceptual diagram of example components utilized for arbitrating device control suggestions and handling user responses thereto. FIG. 4 may include some of the same or similar components as those described with respect to FIG. 1, including a trigger component 126, one or more suggestion models 128, a device selector 132, a notification component 136, and/or a speech processing system 122. FIG. 4 may also include an activity state management system 402, an activity state monitor 404, an arbitration component 406, an event component 408, and/or a response handler 410. The components of FIG. 4 will be described in detail below by way of example.

To illustrate, the trigger component 126 may be configured to detect a trigger event for potentially providing a security-based device control suggestion to a user device. For example, the trigger component 126 may detect changes in user presence states associated with a given environment. To illustrate, a user may move from outside an environment, such as a home for example, to within the environment. While the user is within the environment, the trigger component 126 or another component of the system may detect the user's presence through one or more methodologies described in more detail with respect to FIGS. 11 and 12. For example, acoustic event detection techniques may be utilized to detect sounds within the environment that are indicative of user presence, such as talking, footsteps, the use of appliances, etc. Additionally, or alternatively, when approved to do so by user account data, image data associated with the environment may be processed to determine that an object in the environment is a user and/or that an object is moving such that presence is indicated. Additionally, or alternatively, device data such as the detection of a user personal device within the environment and/or movement of the user personal device may indicate presence. Additionally, or alternatively, state data indicating the changing of device states for devices of the environment may indicate that a user is present in the environment. These and other examples for detecting user presence and the transition of user presence associated with an environment are described in more detail below.

Thereafter, the activity state management system 402 may receive an indicator of the trigger event may be initial a process for determining whether to send a security-based device control suggestion to a user device. For example, the activity state monitor 404 may be configured to monitor the activity state or otherwise the presence state associated with the environment to determine whether the initial presence state transition that caused, at least in part, the trigger event is still associated with the environment and/or whether a different presence state has been detected. When the activity state monitor 404 determines that the presence state still indicates that a suggestion should be sent, the one or more suggestion models 128 may called to determine one or more security-based device control suggestions.

For example, the suggestion models 128 may each be configured to determine a suggestion for a given device and/or device type. For example, a first suggestion model 128 may be configured to determine whether a suggestion should be sent to operate a smart lock, a second suggestion model 128 may be configured to determine whether a suggestion should be sent to operate a garage door, a third suggestion model 128 may be configured to determine whether a suggestion should be sent to operate a security system, etc. Each of these models may run in parallel when a given trigger event is detected by the trigger component 126.

When multiple suggestions are generated by the suggestion models 128, the arbitration component 406 may be configured to determine which of the suggestions should be sent to the user device. For example, the arbitration component 406 may receive data representing the suggestions and may determine whether the suggestions overlap, at least in part, or otherwise whether an action associated with a first suggestion subsumes an action associated with a second suggestion. For example, if the first suggestion is associated with arming a security system and that action includes causing all smart locks associated with the environment to be locked, then a second suggestion produced by the suggestion model associated with door locks to lock a given door lock would not be helpful. In this example, the arbitration component 406 may determine that the first suggestion is to be selected for sending to the user device instead of the second device. In other examples, the arbitration component 406 may be configured to prioritize or otherwise rank suggestions based at least in part on the type of suggestion, previously sent suggestions, interactions with previously sent suggestions, etc.

The event component 408 may be configured to receive a suggestion event associated with the suggestion at issue and to facilitate the sending of the suggestion to one or more devices. In situations where multiple suggestions are sent, the event component 408 may act as a queue for suggestions. Additionally, the device selector 132 may be configured to select a device associated with the account data to send the suggestion to. For example, given account data may be associated with identifiers of multiple devices. Those devices may include tablet computers, laptop computers, desktop computers, mobile phone devices, earbuds or otherwise headphones, watches and/or other wearable devices, automobiles, televisions, smart home accessory devices, etc. Additionally, when more than one user is associated with an environment, some of the devices may be associated with particular users while other devices may be considered communal devices that are utilized frequently by multiple users. In these and other examples, the device selector 132 may be configured to determine which of the devices associated with account data should be selected for receiving the suggestion. To do so, the device selector 132 may utilize presence data associated with the presence detection and/or historical data associated with user presence to determine the user profile of the user that has left the environment. For example, the presence data may indicate that a device associated with the user, such as a mobile phone, earbuds, automobile, etc., has ceased being detected when the presence state transitioned from a home state to an away state. This may indicate that the user that left the environment took the device at issue with the user. In these examples, this device may be selected as the device to receive the suggestion. In other examples, user identification may be performed based at least in part on the presence data. The user identification may include determining a user profile of the user from speech recognition data, from image-based analysis, from device-based beaconing, etc. In these examples, the user profile of the user may indicate one or more personal devices associated with the user. Those personal devices may be selected for receiving the suggestion. In still other examples, user preferences and/or default rules for receiving suggestions may be utilized. For example, a parent, caretaker, or other individual may be designated to receive device control suggestions, even in examples where the presence state transition did not involve that individual. The device selector 132 may also select the device based at least in part on the type of suggestion. For example, when the suggestion is associated with closing a garage door, the device selector 132 may select an automobile or device associated with an automobile of the user to receive the suggestion.

Thereafter, a command generator may be configured to receive the suggestion data and to generate one or more commands that, when received at the selected device, cause the selected device to present the suggestion and/or present an indicator of the suggestion. For example, in some examples the suggestion may be presented automatically or otherwise without receiving user input to output the suggestion. These types of "barge in" suggestions may be provided based at least in part on the suggestion at issue, user preferences, the type of device selected to receive the suggestion, feedback data, historical use of suggestions, etc. In other examples, the command may be sent to the selected device and may cause the selected device to display an indicator that a suggestion is available. When the user provides user input to output the suggestion, the selected device may cause the suggestion to be output. Once the command is generated as described herein, the notification component 136 may be configured to send the command, including the suggestion data, to the selected device. In examples, determining whether to output the suggestion with or without user input may be based at least in part on the device selected to receive the suggestion. For example, if the selected device is earbuds or headphones, particularly where the state data of that device indicates it is currently outputting audio, the suggestion may be automatically output. Additionally, when the device is an automobile or other device where the user's hands are already likely engaged, the suggestion may be output automatically. In other examples where the user is likely to be able to provide user input, the command may cause the notification of the suggestion to be presented and request user input prior to outputting the suggestion.

The user may then interact with the suggestion by providing user input to accept the suggestion or to disregard the suggestion. For example, the user input may include speech input to a voice interface device, touch input to a graphical user interface, etc. When the user input is speech input, the response handler 410 may send the audio data representing the speech into to the speech processing system 122 for determining intent data associated with the response. The response handler 410 may receive the user input data and may utilize the user input data to determine whether the user input accepts or rejects the suggestion. When rejected, the system may determine to refrain from operating the device at issue. The system may generate feedback data associated with the user input and may utilize that feedback data to improve determination of suggestions for future use. When accepted, the system may generate directive data to be sent to the target device in question, either directly or through an intermediary device such as a voice interface device of the environment. The target device may utilize the directive data to operate, such as to close a garage door, arm a security system, lock a door, etc.

Figure 5:
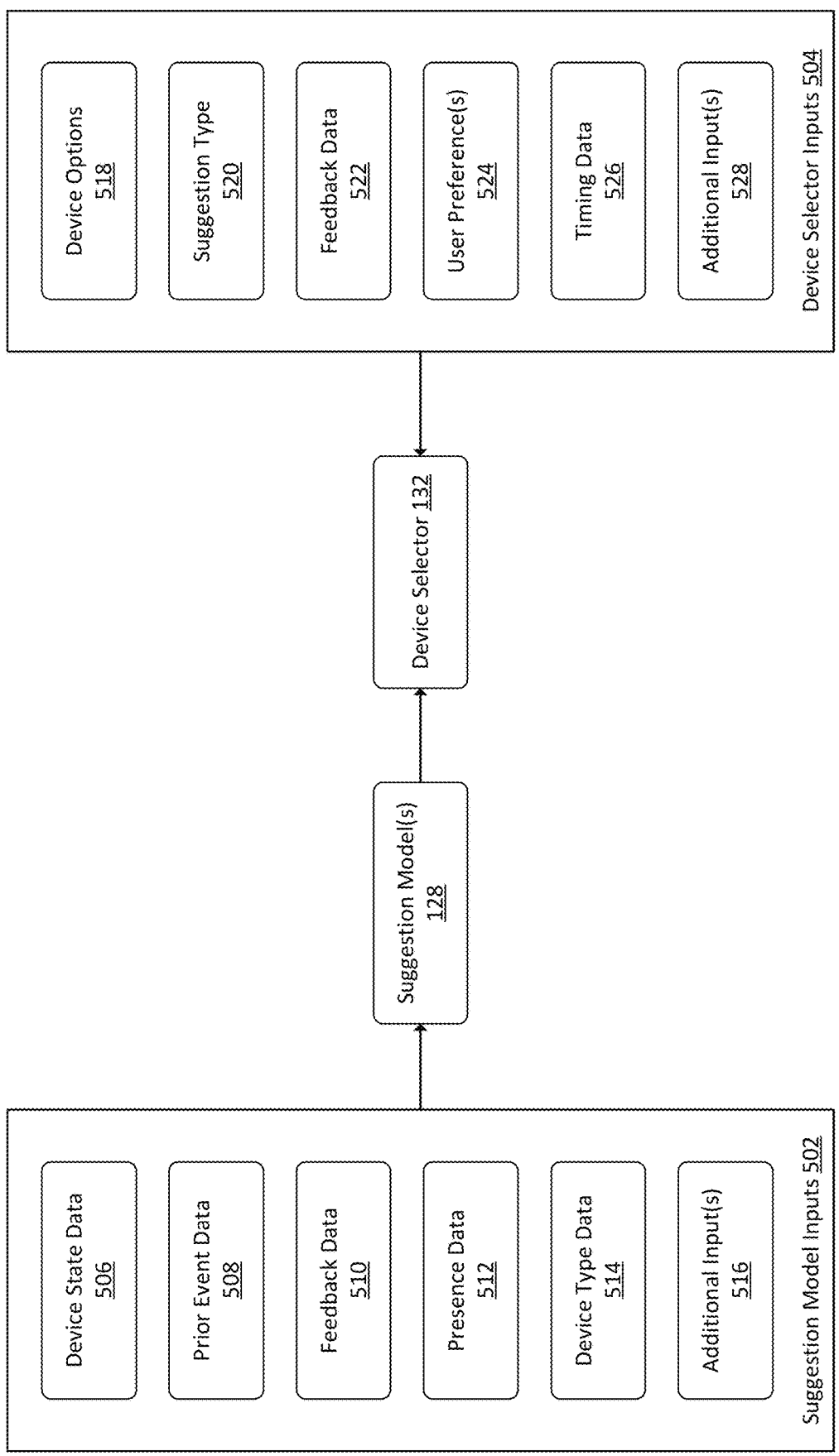

FIG. 5 illustrates a conceptual diagram of example data types utilized for generating device control suggestions and for selecting devices to send the suggestions to. FIG. 5 may include some of the same or similar components as described with respect to FIG. 1, including one or more suggestion models 128 and/or a device selector 132. FIG. 5 may also include one or more suggestion model inputs 502, one or more device selector inputs 504, and data types associated therewith. The components of FIG. 5 will be described in detail below by way of example.

To illustrate, the one or more suggestion models 128 may generate security-based device control suggestions as described herein. To do so, the models 128 may utilize one or more of the suggestion model inputs 502. Those suggestion model inputs 502 may include, for example, device state data 506, prior event data 508, feedback data 510, presence data 512, device type data 514, and/or one or more additional inputs. The device state data 506 may indicate device states of the devices associated with the environment. For example, the device state data 506 may indicate whether a smart lock is in a locked state or an unlocked state, whether a garage door opener indicates the garage door is in a closed state or in an open state, whether a security system is in an armed state or a disarmed state, whether motion sensors are in an on state or an off state, whether security cameras are in an on state or an off state, etc.

The prior event data 508 may include indications of prior events, which may be security-based or not security-based, that have previously been associated with security-based device control suggestions. For example, while the trigger component may initiate device control suggestions based on the detection of a presence state transition, other events associated with the system may increase or decrease a confidence value associated with the transition and/or otherwise provide indicators of whether the devices at issue should be operated. For example, when a user leaves an environment the user may provide user input to turn off lights, to set a thermostat to a different temperature, to turn off a television and/or another appliance, to open a garage door, etc. Indicators of these events may be stored in the event database and when those events correspond to a presence state transition from a home state to an away state, those events may be associated with indicators that a device control suggestion should be sent. When event data is utilized as described herein, the event database may receive the event data from one or more domains associated with the system, such as one or more domains associated with speech processing. The domains may include a smart home domain, a music domain, a content-provider domain, etc.

The feedback data 510 may indicate previous interactions with suggestions by the user and/or other users associated with the account data. The interactions may include acceptance of suggestions, rejection of suggestions, feedback concerning the validity of the suggestions, timing of suggestion interactions, devices utilized to provide user input for responding to suggestions, whether automatic suggestions are accepted more frequently than suggestions that require user input before being presented, etc. The presence data 512 may include at least a portion of the data utilized to determine that presence state transition as described herein. That presence data 512 may indicate a direction of movement of the user, the user identity, which devices are associated with the presence event, etc. The device type data 514 may include the modality of the user devices that may receive the suggestions, which user profiles are associated with which devices, the number of devices having a given device type, etc. The additional inputs 516 may include any other inputs that the suggestion models 128 may utilize to determine whether to send a suggestion and/or what type of suggestion to send. The additional inputs 516 may include inputs learned via machine learning techniques as described herein.

These suggestion model inputs 502 may be utilized to determine whether a device control suggestion should be sent, and if so, what the suggestion should be. In examples, the suggestion models 128 may each be configured to determine a suggestion for a given device and/or device type. For example, a first suggestion model 128 may be configured to determine whether a suggestion should be sent to operate a smart lock, a second suggestion model 128 may be configured to determine whether a suggestion should be sent to operate a garage door, a third suggestion model 128 may be configured to determine whether a suggestion should be sent to operate a security system, etc. Each of these models may run in parallel when a given trigger event is detected by the trigger component 126.

The device selector 132 may then be called to determine which device to select for receiving the suggestion. To do so, the device selector 132 may utilize one or more of the device selector inputs 504 described herein, such as device options 518, suggestion types 520, feedback data 522, user preferences 524, timing data 526, and/or one or more additional inputs 528. To illustrate, the device options 518 include indicators of the capabilities of the devices associated with the account data. The capabilities may include whether the devices have a display, have a speaker, have a microphone, are configured to output notifications just to the user in question such as via headphones and/or earbuds, etc. The capabilities may also include indicators of the functionalities of the devices, such as an automobile, a television, etc. The suggestion types 520 may include indicators of which suggestion model 128 produced the suggestion and/or what target devices are to be acted on if the suggestion is accepted. The feedback data 522 may be the same or similar to the feedback data 510 described with respect to the suggestion model inputs 502. The user preferences 524 may indicate user profiles that are to receive suggestions by default, which devices are to receive suggestions by default, which devices have been selected as eligible for receiving suggestions, which devices have been indicated for not receiving suggestions, etc. The timing data 526 may indicate which devices are associated with a time when the presence state transition occurred, when previous suggestions were accepted and/or rejected, etc. The additional inputs 528 may include any other inputs that may inform selection of the device to receive the suggestion. As with the additional inputs 516 of the suggestion model inputs 502, the additional inputs 528 may be learned over time utilizing machine learning techniques.

The device selector 132 may be configured to select a device associated with the account data to send the suggestion to. For example, given account data may be associated with identifiers of multiple devices 102Those devices may include tablet computers, laptop computers, desktop computers, mobile phone devices, earbuds or otherwise headphones, watches and/or other wearable devices, automobiles, televisions, smart home accessory devices, etc. Additionally, when more than one user is associated with an environment, some of the devices may be associated with particular users while other devices may be considered communal devices that are utilized frequently by multiple users. In these and other examples, the device selector 132 may be configured to determine which of the devices associated with account data should be selected for receiving the suggestion. To do so, the device selector 132 may utilize presence data associated with the presence detection and/or historical data associated with user presence to determine the user profile of the user that has left the environment. For example, the presence data may indicate that a device associated with the user, such as a mobile phone, earbuds, automobile, etc., has ceased being detected when the presence state transitioned from a home state to an away state. This may indicate that the user that left the environment took the device at issue with the user. In these examples, this device may be selected as the device to receive the suggestion. In other examples, user identification may be performed based at least in part on the presence data. The user identification may include determining a user profile of the user from speech recognition data, from image-based analysis, from device-based beaconing, etc. In these examples, the user profile of the user may indicate one or more personal devices associated with the user. Those personal devices may be selected for receiving the suggestion. In still other examples, user preferences and/or default rules for receiving suggestions may be utilized. For example, a parent, caretaker, or other individual may be designated to receive device control suggestions, even in examples where the presence state transition did not involve that individual. The device selector 132 may also select the device based at least in part on the type of suggestion. For example, when the suggestion is associated with closing a garage door, the device selector 132 may select an automobile or device associated with an automobile of the user to receive the suggestion.

Figure 6A:
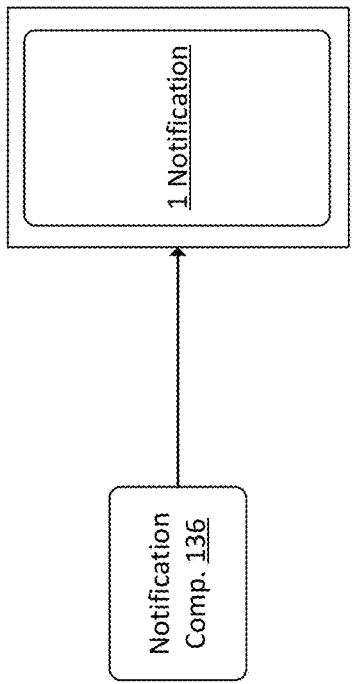
FIG. 6A illustrates a first suggestion delivery methodology and associated output of the first suggestion.

FIG. 6A illustrates a first suggestion delivery methodology and associated output of the first suggestion. For example, a device may be selected from multiple possible devices associated with account data to receive a given device control suggestion. A suggestion formatter may be configured to determine a format of the suggestion based at least in part on the device selected to receive the suggestion. For example, when a multi-modal devices that includes a display and a speaker is selected, the suggestion formatter may be configured to format the suggestion as text data for presentation of a text suggestion on the display and/or as audio data for output of corresponding audio by the speaker. When the selected device does not include a display, the suggestion formatter may be configured to format the suggestion as audio data. Thereafter, a command generator may be configured to receive the suggestion data and to generate one or more commands that, when received at the selected device, cause the selected device to present the suggestion and/or present an indicator of the suggestion. For example, in some examples the suggestion may be presented automatically or otherwise without receiving user input to output the suggestion. These types of "barge in" suggestions may be provided based at least in part on the suggestion at issue, user preferences, the type of device selected to receive the suggestion, feedback data, historical use of suggestions, etc. In other examples, the command may be sent to the selected device and may cause the selected device to display an indicator that a suggestion is available. When the user provides user input to output the suggestion, the selected device may cause the suggestion to be output. Once the command is generated as described herein, the notification component may be configured to send the command, including the suggestion data, to the selected device. In examples, determining whether to output the suggestion with or without user input may be based at least in part on the device selected to receive the suggestion.

Using FIG. 6A as an example, the selected device is a "headless" voice interface device that includes a speaker but does not include a display. The voice interface device may be associated with a robust speech processing system with a text-to-speech component that may be configured to generate synthesized speech in a human-sounding manner. As such, the first suggestion may be formatted as audio data, and the selected device may output audio corresponding to the audio data. In FIG. 6, the audio is "want me to arm Security System as requested?" Here, an explanation for the suggestion of arming the security system is also provided, namely that the user has requested such an action to be performed when the system detects a condition of the environment, to provide context for why the suggestion was sent.

In the example of FIG. 6A, a user profile may indicate that permission has been given to determine when a potential event is going to happen or to otherwise predict that an event is about to happen. Utilizing the security-based example provided here, the activity models as described herein may determine that while a user is still present in the environment, the user is likely about to leave. The activity models may predict this potential change in activity state based at least in part on sensor data indicating the potential change in state. For example, the user of a garage door, an acoustic event corresponding to the turning on of a vehicle, the locking of doors, the shutting of windows, audio data indicating that user is leaving, image data indicating the user is moving toward a door, movement of a user device, etc. A user may have provided consent for the system to detect such conditions of an environment and preemptively provide a device control suggestion based on the system determining that an activity state of the environment will likely transition from a home state to an away state.

Figure 6B:
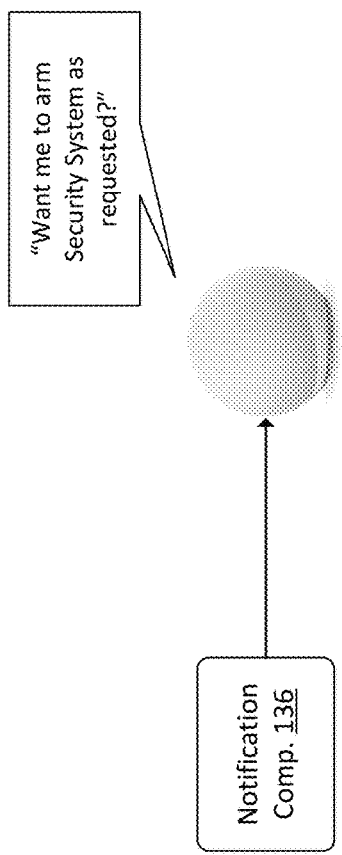
FIG. 6B illustrates a second suggestion delivery methodology and associated output of the second suggestion.

FIG. 6B illustrates a second suggestion delivery methodology and associated output of the second suggestion. For example, a device may be selected from multiple possible devices associated with account data to receive a given security-based device control suggestion. A suggestion formatter may be configured to determine a format of the suggestion based at least in part on the device selected to receive the suggestion. For example, when a multi-modal devices that includes a display and a speaker is selected, the suggestion formatter may be configured to format the suggestion as text data for presentation of a text suggestion on the display and/or as audio data for output of corresponding audio by the speaker. When the selected device does not include a display, the suggestion formatter may be configured to format the suggestion as audio data. Thereafter, a command generator may be configured to receive the suggestion data and to generate one or more commands that, when received at the selected device, cause the selected device to present the suggestion and/or present an indicator of the suggestion. For example, in some examples the suggestion may be presented automatically or otherwise without receiving user input to output the suggestion. These types of "barge in" suggestions may be provided based at least in part on the suggestion at issue, user preferences, the type of device selected to receive the suggestion, feedback data, historical use of suggestions, etc. In other examples, the command may be sent to the selected device and may cause the selected device to display an indicator that a suggestion is available. When the user provides user input to output the suggestion, the selected device may cause the suggestion to be output. Once the command is generated as described herein, the notification component 136 may be configured to send the command, including the suggestion data, to the selected device. In examples, determining whether to output the suggestion with or without user input may be based at least in part on the device selected to receive the suggestion.

Using FIG. 6B as an example, the selected device is multi-modal device that includes a speaker and a display. Given the presence of the display, the suggestion may initially be presented as a notification that a suggestion has been received, but may not include the suggestion itself. In this way, security-related issues associated with presenting the suggestion may be minimized by requesting that the user interact with the notification prior to displaying the suggestion. In other examples where a first automatic output of the suggestion on another device was not successful, the notification may then be sent to the multi-modal device as a backup suggestion.

Figure 6C:
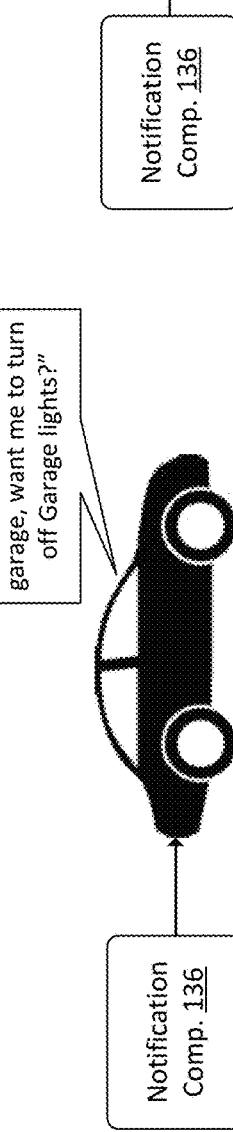
FIG. 6C illustrates a third suggestion delivery methodology and associated output of the third suggestion.

FIG. 6C illustrates a third suggestion delivery methodology and associated output of the third suggestion. For example, a device may be selected from multiple possible devices associated with account data to receive a given security-based device control suggestion. A suggestion formatter may be configured to determine a format of the suggestion based at least in part on the device selected to receive the suggestion. For example, when a multi-modal devices that includes a display and a speaker is selected, the suggestion formatter may be configured to format the suggestion as text data for presentation of a text suggestion on the display and/or as audio data for output of corresponding audio by the speaker. When the selected device does not include a display, the suggestion formatter may be configured to format the suggestion as audio data. Thereafter, a command generator may be configured to receive the suggestion data and to generate one or more commands that, when received at the selected device, cause the selected device to present the suggestion and/or present an indicator of the suggestion. For example, in some examples the suggestion may be presented automatically or otherwise without receiving user input to output the suggestion. These types of "barge in" suggestions may be provided based at least in part on the suggestion at issue, user preferences, the type of device selected to receive the suggestion, feedback data, historical use of suggestions, etc. In other examples, the command may be sent to the selected device and may cause the selected device to display an indicator that a suggestion is available. When the user provides user input to output the suggestion, the selected device may cause the suggestion to be output. Once the command is generated as described herein, the notification component 136 may be configured to send the command, including the suggestion data, to the selected device. In examples, determining whether to output the suggestion with or without user input may be based at least in part on the device selected to receive the suggestion.

Using FIG. 6C as an example, the selected device is an automobile. In this example, the user's hands are already likely engaged in the act of driving, and thus the suggestion may be output automatically. Additionally, FIG. 6C illustrates the selection of the automobile device for receiving the suggestion based on a subject matter of the suggestion. Here, the suggestion is about turning off a garage light. Given that the automobile is associated with garage lights in the sense that users generally operate garage lights, the automobile may be selected as the device to receive the suggestion.

Figure 6D:
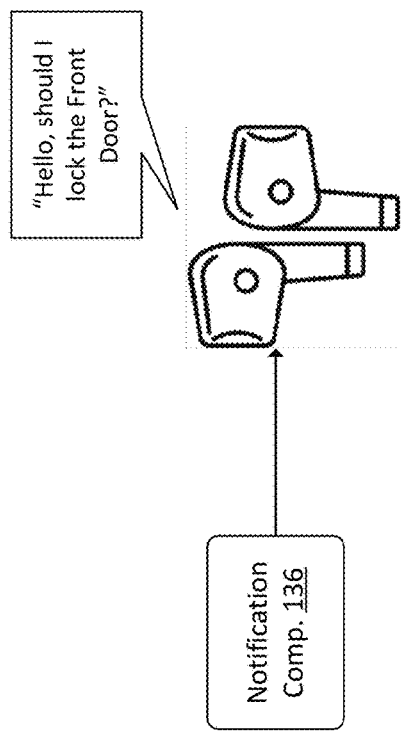
FIG. 6D illustrates a fourth suggestion delivery methodology and associated output of the fourth suggestion.

FIG. 6D illustrates a fourth suggestion delivery methodology and associated output of the fourth suggestion. For example, a device may be selected from multiple possible devices associated with account data to receive a given security-based device control suggestion. A suggestion formatter may be configured to determine a format of the suggestion based at least in part on the device selected to receive the suggestion. For example, when a multi-modal devices that includes a display and a speaker is selected, the suggestion formatter may be configured to format the suggestion as text data for presentation of a text suggestion on the display and/or as audio data for output of corresponding audio by the speaker. When the selected device does not include a display, the suggestion formatter may be configured to format the suggestion as audio data. Thereafter, a command generator may be configured to receive the suggestion data and to generate one or more commands that, when received at the selected device, cause the selected device to present the suggestion and/or present an indicator of the suggestion. For example, in some examples the suggestion may be presented automatically or otherwise without receiving user input to output the suggestion. These types of "barge in" suggestions may be provided based at least in part on the suggestion at issue, user preferences, the type of device selected to receive the suggestion, feedback data, historical use of suggestions, etc. In other examples, the command may be sent to the selected device and may cause the selected device to display an indicator that a suggestion is available. When the user provides user input to output the suggestion, the selected device may cause the suggestion to be output. Once the command is generated as described herein, the notification component 136 may be configured to send the command, including the suggestion data, to the selected device. In examples, determining whether to output the suggestion with or without user input may be based at least in part on the device selected to receive the suggestion.

Using FIG. 6D as an example, the selected device is earbuds and/or headphones. In this example, particularly where the state data of that device indicates it is currently outputting audio, the suggestion may be automatically output. To do so, the audio currently being output by the headphones may be paused or the volume diminished and the audio representing the suggestion may be output. Additionally, given the potentially disruptive nature of automatically outputting the suggestion, as opposed to the example of FIG. 6A where an explanation is provided with the suggestion, the suggestion may be provided without an explanation or with a more succinct explanation.

Figure 7:
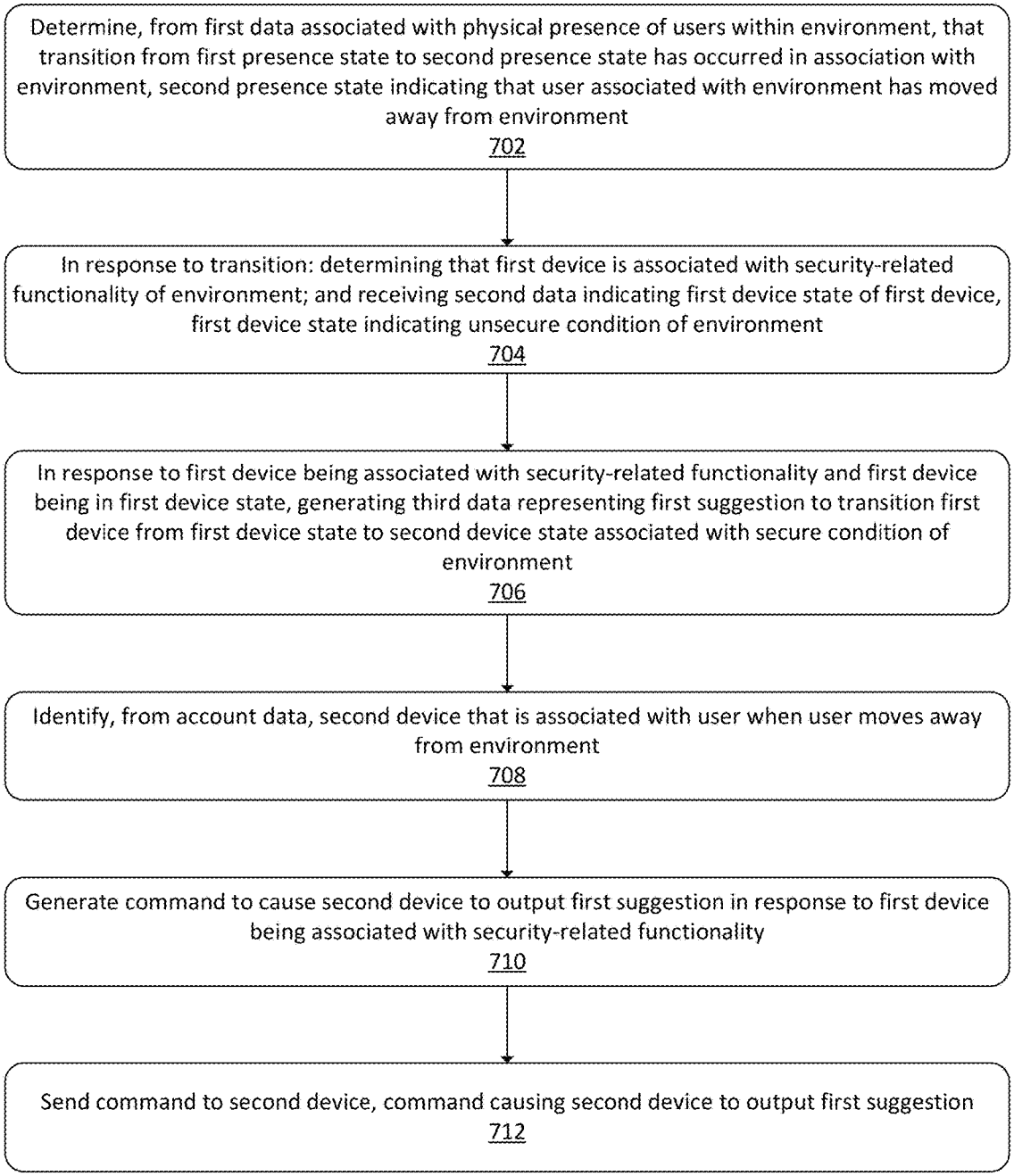
FIG. 7 illustrates a flow diagram of an example process for state determination and device control.

FIGS. 7 and 8 illustrate processes for security-based device control. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-6D and 9-12, although the processes may be implemented in a wide variety of other environments, architectures and systems.

FIG. 7 illustrates a flow diagram of an example process 700 for state determination and device control. The order in which the operations or steps are described is not intended to be construed as a limitation, and any number of the described operations may be combined in any order and/or in parallel to implement process 700.

At block 702, the process 700 may include determining, from first data associated with physical presence of users within an environment, that a transition from a first presence state to a second presence state has occurred in association with the environment, the second presence state indicating that a user associated with the environment has moved away from the environment. For example, acoustic event detection techniques may be utilized to detect sounds within the environment that are indicative of user presence, such as talking, footsteps, the use of appliances, etc. Additionally, or alternatively, when approved to do so by user account data, image data associated with the environment may be processed to determine that an object in the environment is a user and/or that an object is moving such that presence is indicated. Additionally, or alternatively, device data such as the detection of a user personal device within the environment and/or movement of the user personal device may indicate presence. Additionally, or alternatively, state data indicating the changing of device states for devices of the environment may indicate that a user is present in the environment. These and other examples for detecting user presence and the transition of user presence associated with an environment are described in more detail below.

At block 704, the process 700 may include, in response to the transition: determining that a first device is associated with security-related functionality of the environment; and receiving second data indicating a first device state of the first device, the first device state indicating an unsecure condition of the environment. For example, some devices may be associated with security-related functionality, such as smart locks, garage door openers, security systems, etc. Other devices may not be security related, such as smart lights, plugs, kitchen appliances, etc. Additionally, the second data may be received from the device itself, from a database storing the second data, and/or from one or more remote systems associated with the device.

At block 706, the process 700 may include, in response to the first device being associated with the security-related functionality and the first device being in the first device state, generating third data representing a first suggestion to transition the first device from the first device state to a second device state associated with a secure condition of the environment. To illustrate utilizing the three suggestion models highlighted above as an example, the lock suggestion model may determine whether the account data associated with the environment at issue indicates that security-related device control suggestions are eligible to be sent. For example, the account data may indicate whether user preferences have been set up and indicate that suggestions are enabled. The account data may also indicate whether the environment includes a device with a device type associated with the suggestion model and/or whether the account data indicates that the user has a personal user device to send data representing the suggestion to. When the account data indicates that the security-related device control suggestion is eligible to be sent, data associated with the devices at issue, the environment, and/or the trigger event may be received. This data may include indicators of the state of devices in the environment, particularly the lock device associated with the lock suggestion model. Thereafter, a candidate generator of the lock suggestion model may generate candidate suggestions and may rank those candidate suggestions based at least in part on the collected data, the trigger event, confidence values associated with the trigger event, and/or other factors associated with the environment and the presence state at issue. Additionally, a guardrail component may be configured to apply one or more rules to ensure that a to-be-sent suggestion is desirable to be sent. For example, the rules may indicate that only one or a given number of suggestions and/or suggestion types are to be sent in a given period of time. The guardrail component may utilize historical use data associated with previously-sent suggestions and/or user feedback data from previously-sent suggestions to determine the one or more rules. Other guardrails may include determining an amount of time from when the presence state transition was detected and determining to only send suggestions once a threshold amount of time has passed. This may prevent a suggestion from being sent before the user has an opportunity to operate the devices at issue without a suggestion. Other suggestions models, such as a garage door suggestion model and a security system suggestion model, for example, may perform similar processes associated with those devices and/or systems to determine whether a device control suggestion should be sent, and if so what the suggestion should be.

At block 708, the process 700 may include identifying, from account data, a second device that is associated with the user when the user moves away from the environment. For example, given account data may be associated with identifiers of multiple devices. Those devices may include tablet computers, laptop computers, desktop computers, mobile phone devices, earbuds or otherwise headphones, watches and/or other wearable devices, automobiles, televisions, smart home accessory devices, etc. Additionally, when more than one user is associated with an environment, some of the devices may be associated with particular users while other devices may be considered communal devices that are utilized frequently by multiple users. In these and other examples, the device selector may be configured to determine which of the devices associated with account data should be selected for receiving the suggestion. To do so, the device selector may utilize presence data associated with the presence detection and/or historical data associated with user presence to determine the user profile of the user that has left the environment. For example, the presence data may indicate that a device associated with the user, such as a mobile phone, earbuds, automobile, etc., has ceased being detected when the presence state transitioned from a home state to an away state. This may indicate that the user that left the environment took the device at issue with the user. In these examples, this device may be selected as the device to receive the suggestion. In other examples, user identification may be performed based at least in part on the presence data. The user identification may include determining a user profile of the user from speech recognition data, from image-based analysis, from device-based beaconing, etc. In these examples, the user profile of the user may indicate one or more personal devices associated with the user. Those personal devices may be selected for receiving the suggestion. In still other examples, user preferences and/or default rules for receiving suggestions may be utilized. For example, a parent, caretaker, or other individual may be designated to receive device control suggestions, even in examples where the presence state transition did not involve that individual. The device selector may also select the device based at least in part on the type of suggestion. For example, when the suggestion is associated with closing a garage door, the device selector may select an automobile or device associated with an automobile of the user to receive the suggestion.

At block 710, the process 700 may include generating a command to cause the second device to output the first suggestion in response to the first device being associated with the security-related functionality. For example, a command generator may be configured to receive the suggestion data and to generate one or more commands that, when received at the selected device, cause the selected device to present the suggestion and/or present an indicator of the suggestion. For example, in some examples the suggestion may be presented automatically or otherwise without receiving user input to output the suggestion. These types of "barge in" suggestions may be provided based at least in part on the suggestion at issue, user preferences, the type of device selected to receive the suggestion, feedback data, historical use of suggestions, etc. In other examples, the command may be sent to the selected device and may cause the selected device to display an indicator that a suggestion is available. When the user provides user input to output the suggestion, the selected device may cause the suggestion to be output.

At block 712, the process 700 may include sending the command to the second device, the command causing the second device to output the first suggestion. Once the command is generated as described herein, a notification component of the system may be configured to send the command, including the suggestion data, to the selected device. In examples, determining whether to output the suggestion with or without user input may be based at least in part on the device selected to receive the suggestion. For example, if the selected device is earbuds or headphones, particularly where the state data of that device indicate it is currently outputting audio, the suggestion may be automatically output. Additionally, when the device is an automobile or other device where the user's hands are already likely engaged, the suggestion may be output automatically. In other examples where the user is likely to be able to provide user input, the command may cause the notification of the suggestion to be presented and request user input prior to outputting the suggestion.

Additionally, or alternatively, the process 700 may include, in response to the transition, identifying devices associated with the security-related functionality of the environment, the devices including the first device and a third device. The process 700 may also include receiving, while receiving the second data, fourth data indicating a third device state of the third device, the third device state indicating the unsecure condition of the environment. The process 700 may also include generating, while generating the third data, fifth data representing a second suggestion to transition the third device from the third device state to a fourth device state, the fourth device state associated with the secure condition of the environment and differing from the second device state associated with the first device. In these examples, the command may cause the second device to output the second suggestion with the first suggestion.

Additionally, or alternatively, the process 700 may include determining that fourth data representing a response to the first suggestion is unreceived within a period of time from when the command is sent. The process 700 may also include determining, in response to the response being unreceived and from the account data, a third device associated with the user. The process 700 may also include sending the third data representing the first suggestion to the third device, the third device configured to display the first suggestion in response to receiving user input to view the first suggestion.

Additionally, or alternatively, the process 700 may include receiving fourth data indicating an event that occurs in association with a speech processing system, the event unrelated to the security-related functionality of the environment. The process 700 may also include associating the event with the first suggestion in response to the event occurring at a time when the transition occurs and receiving fifth data indicating that the event has occurred. The process 700 may also include sending the command in part in response to the fifth data indicating that the event has occurred.

FIG. 8 illustrates a flow diagram of another example process 800 for state determination and device control. The order in which the operations or steps are described is not intended to be construed as a limitation, and any number of the described operations may be combined in any order and/or in parallel to implement process 800.

At block 802, the process 800 may include determining, based at least in part on first data associated with presence detection within an environment, that a transition from a first presence state to a second presence state has occurred in association with the environment, the second presence state indicating that user presence has ceased being detected in association with the environment. For example, acoustic event detection techniques may be utilized to detect sounds within the environment that are indicative of user presence, such as talking, footsteps, the use of appliances, etc. Additionally, or alternatively, when approved to do so by user account data, image data associated with the environment may be processed to determine that an object in the environment is a user and/or that an object is moving such that presence is indicated. Additionally, or alternatively, device data such as the detection of a user personal device within the environment and/or movement of the user personal device may indicate presence. Additionally, or alternatively, state data indicating the changing of device states for devices of the environment may indicate that a user is present in the environment. These and other examples for detecting user presence and the transition of user presence associated with an environment are described in more detail below.

At block 804, the process 800 may include receiving, based at least in part on the transition, second data indicating a first device state of a first device associated with the environment, the first device associated with security-related functionality. For example, some devices may be associated with security-related functionality, such as smart locks, garage door openers, security systems, etc. Other devices may not be security related, such as smart lights, plugs, kitchen appliances, etc. Additionally, the second data may be received from the device itself, from a database storing the second data, and/or from one or more remote systems associated with the device.

At block 806, the process 800 may include generating, based at least in part on the first device being associated with the security-related functionality and being in the first device state, third data representing a first suggestion to transition the first device from the first device state to a second device state. To illustrate utilizing the three suggestion models highlighted above as an example, the lock suggestion model may determine whether the account data associated with the environment at issue indicates that security-related device control suggestions are eligible to be sent. For example, the account data may indicate whether user preferences have been set up and indicate that suggestions are enabled. The account data may also indicate whether the environment includes a device with a device type associated with the suggestion model and/or whether the account data indicates that the user has a personal user device to send data representing the suggestion to. When the account data indicates that the device control suggestion is eligible to be sent, data associated with the devices at issue, the environment, and/or the trigger event may be received. This data may include indicators of the state of devices in the environment, particularly the lock device associated with the lock suggestion model. Thereafter, a candidate generator of the lock suggestion model may generate candidate suggestions and may rank those candidate suggestions based at least in part on the collected data, the trigger event, confidence values associated with the trigger event, and/or other factors associated with the environment and the presence state at issue. Additionally, a guardrail component may be configured to apply one or more rules to ensure that a to-be-sent suggestion is desirable to be sent. For example, the rules may indicate that only one or a given number of suggestions and/or suggestion types are to be sent in a given period of time. The guardrail component may utilize historical use data associated with previously-sent suggestions and/or user feedback data from previously-sent suggestions to determine the one or more rules. Other guardrails may include determining an amount of time from when the presence state transition was detected and determining to only send suggestions once a threshold amount of time has passed. This may prevent a suggestion from being sent before the user has an opportunity to operate the devices at issue without a suggestion. Other suggestions models, such as a garage door suggestion model and a security system suggestion model, for example, may perform similar processes associated with those devices and/or systems to determine whether a device control suggestion should be sent, and if so what the suggestion should be.

At block 808, the process 800 may include determining, based at least in part on account data, a second device that was associated with the first presence state. For example, given account data may be associated with identifiers of multiple devices. Those devices may include tablet computers, laptop computers, desktop computers, mobile phone devices, earbuds or otherwise headphones, watches and/or other wearable devices, automobiles, televisions, smart home accessory devices, etc. Additionally, when more than one user is associated with an environment, some of the devices may be associated with particular users while other devices may be considered communal devices that are utilized frequently by multiple users. In these and other examples, the device selector may be configured to determine which of the devices associated with account data should be selected for receiving the suggestion. To do so, the device selector may utilize presence data associated with the presence detection and/or historical data associated with user presence to determine the user profile of the user that has left the environment. For example, the presence data may indicate that a device associated with the user, such as a mobile phone, earbuds, automobile, etc., has ceased being detected when the presence state transitioned from a home state to an away state. This may indicate that the user that left the environment took the device at issue with the user. In these examples, this device may be selected as the device to receive the suggestion. In other examples, user identification may be performed based at least in part on the presence data. The user identification may include determining a user profile of the user from speech recognition data, from image-based analysis, from device-based beaconing, etc. In these examples, the user profile of the user may indicate one or more personal devices associated with the user. Those personal devices may be selected for receiving the suggestion. In still other examples, user preferences and/or default rules for receiving suggestions may be utilized. For example, a parent, caretaker, or other individual may be designated to receive device control suggestions, even in examples where the presence state transition did not involve that individual. The device selector may also select the device based at least in part on the type of suggestion. For example, when the suggestion is associated with closing a garage door, the device selector may select an automobile or device associated with an automobile of the user to receive the suggestion.

At block 810, the process 800 may include sending a command to the second device, the command causing the second device to output the first suggestion based at least in part on the first device being associated with the security-related functionality. For example, a command generator may be configured to receive the suggestion data and to generate one or more commands that, when received at the selected device, cause the selected device to present the suggestion and/or present an indicator of the suggestion. For example, in some examples the suggestion may be presented automatically or otherwise without receiving user input to output the suggestion. These types of "barge in" suggestions may be provided based at least in part on the suggestion at issue, user preferences, the type of device selected to receive the suggestion, feedback data, historical use of suggestions, etc. In other examples, the command may be sent to the selected device and may cause the selected device to display an indicator that a suggestion is available. When the user provides user input to output the suggestion, the selected device may cause the suggestion to be output.

Additionally, or alternatively, the process 800 may include identifying, based at least in part on the transition, a third device associated with the security-related functionality. The process 800 may also include receiving, while receiving the second data, fourth data indicating a third device state of the third device. The process 800 may also include generating, while generating the third data, fifth data representing a second suggestion to transition the third device from the third device state to a fourth device state, the fourth device state differing from the second device state associated with the first device. In these examples, the command may cause the second device to output the second suggestion with the first suggestion.

Additionally, or alternatively, the process 800 may include determining that fourth data representing a response to the first suggestion is absent. The process 800 may also include determining, based at least in part on the response being absent, a third device associated with the user. The process 800 may also include sending the third data representing the first suggestion to the third device based at least in part on the first device being associated with the security-related functionality.

Additionally, or alternatively, the process 800 may include receiving fourth data indicating an event associated with a speech processing system, the event differing from the security-related functionality. The process 800 may also include associating the event with the first suggestion based at least in part on the event occurring at a time associated with the transition. The process 800 may also include sending the command based at least in part on receiving fifth data indicating that the event has occurred.

Additionally, or alternatively, the process 800 may include generating, based at least in part on the first device being associated with the security-related functionality, fourth data representing an explanation for sending the first suggestion, the fourth data generating utilizing the first data and the second data. In these examples, the first suggestion may include the explanation.

Additionally, or alternatively, the process 800 may include determining that the second device is outputting first audio at a time when the third data representing the first suggestion is generated. The process 800 may also include, based at least in part on the second device outputting the first audio, generating audio data representing the first suggestion. In these examples, the command may be configured to cause the second device to output second audio corresponding to the audio data instead of the first audio.

Additionally, or alternatively, the process 800 may include determining a third device associated with the security-related functionality, wherein the first suggestion is associated with the first device and the third device. The process 800 may also include generating, based at least in part on the transition, fourth data representing a second suggestion to transition a security system associated with the environment from a first state to a second state, the security system including the third device. The process 800 may also include determining to refrain from sending the second suggestion with the first suggestion based at least in part on the security system including the third device.

Additionally, or alternatively, the process 800 may include determining that the second device is associated with a subject matter of the first suggestion. The process 800 may also include selecting the second device from multiple devices associated with the account data based at least in part on the second device being associated with the subject matter of the first suggestion.

Additionally, or alternatively, the process 800 may include determining a set of devices associated with the account data that have device types indicated as having security-based functionality, the device types including the second device type. The process 800 may also include determining that a first identifier of the first device is absent from the set of devices. The process 800 may also include determining that a second identifier of the second device is included in the set of devices. In these examples, determining to utilize the first data instead of the second data may be in response to the first identifier being absent from the set of devices and the second identifier being included in the set of devices.

Figure 9:
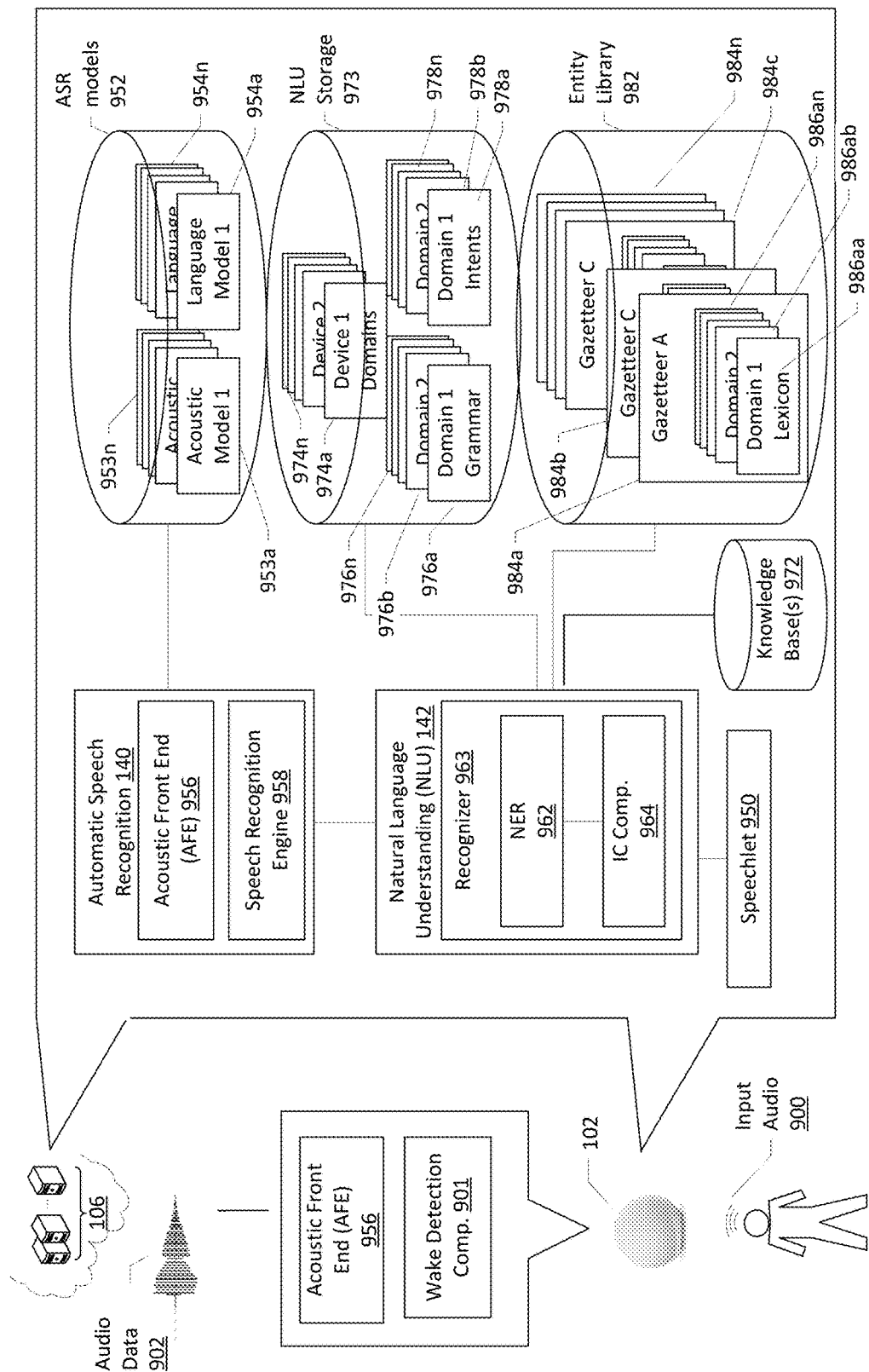
FIG. 9 illustrates a conceptual diagram of components of a speech-processing system for processing audio data provided by one or more devices.

FIG. 9 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 9 may occur directly or across a network 108. An audio capture component, such as a microphone 116 of the device 102, or another device, captures audio 900 corresponding to a spoken utterance. The device 102, using a wake word engine 901, then processes audio data corresponding to the audio 900 to determine if a keyword (such as a wakeword) is detected in the audio data. Following detection of a wakeword, the device 102 processes audio data 902 corresponding to the utterance utilizing an ASR component 140. The audio data 902 may be output from an optional acoustic front end (AFE) 956 located on the device prior to transmission. In other instances, the audio data 902 may be in a different form for processing by a remote AFE 956, such as the AFE 956 located with the ASR component 140.

The wake word engine 901 works in conjunction with other components of the user device, for example a microphone to detect keywords in audio 900. For example, the device may convert audio 900 into audio data, and process the audio data with the wake word engine 901 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input: the energy levels of the audio input in one or more spectral bands: the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 901 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 901 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake." The audio data 902 may include data corresponding to the wakeword. Further, a local device may "wake" upon detection of speech/spoken audio above a threshold, as described herein. An ASR component 140 may convert the audio data 902 into text. The ASR transcribes audio data into text data representing the words of the speech contained in the audio data 902. The text data may then be used by other components for various purposes, such as executing system commands, inputting data, etc. A spoken utterance in the audio data is input to a processor configured to perform ASR which then interprets the utterance based on the similarity between the utterance and pre-established language models 954 stored in an ASR model knowledge base (ASR Models Storage 952). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 953 stored in an ASR Models Storage 952), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 140 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 956 and a speech recognition engine 958. The acoustic front end (AFE) 956 transforms the audio data from the microphone into data for processing by the speech recognition engine 958. The speech recognition engine 958 compares the speech recognition data with acoustic models 953, language models 954, and other data models and information for recognizing the speech conveyed in the audio data. The AFE 956 may reduce noise in the audio data and divide the digitized audio data into frames representing time intervals for which the AFE 956 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 958 may process the output from the AFE 956 with reference to information stored in speech/model storage (952). Alternatively, post front-end processed data (such as feature vectors) may be received by the device executing ASR processing from another source besides the internal AFE. For example, the user device may process audio data into feature vectors (for example using an on-device AFE 956).

The speech recognition engine 958 attempts to match received feature vectors to language phonemes and words as known in the stored acoustic models 953 and language models 954. The speech recognition engine 958 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, order ice cream and milk?" The wake detection component may identify the wake word, otherwise described as a trigger expression, "Alexa," in the user utterance and may "wake" based on identifying the wake word. The speech recognition engine 958 may identify, determine, and/or generate text data corresponding to the user utterance, here "order ice cream and milk."

The speech recognition engine 958 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 958 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 142 may include various components, including potentially dedicated processor(s), memory, storage, etc. As shown in FIG. 9, an NLU component 142 may include a recognizer 963 that includes a named entity recognition (NER) component 962 which is used to identify portions of query text that correspond to a named entity that may be recognizable by the system. A downstream process called named entity resolution links a text portion to a specific entity known to the system. To perform named entity resolution, the system may utilize gazetteer information (984a-984n) stored in entity library storage 982. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 140 based on the utterance input audio 900) and attempts to make a semantic interpretation of the text. That is, the NLU process determines the meaning behind the text based on the individual words and then implements that meaning. NLU processing 142 interprets a text string to derive an intent or a desired action from the user as well as the pertinent pieces of information in the text that allow a device (e.g., device 102) to complete that action. For example, if a spoken utterance is processed using ASR 140 and outputs the text "order ice cream and milk" the NLU process may determine that the user intended to order food, with the food being ice cream and milk.

The NLU 142 may process several textual inputs related to the same utterance. For example, if the ASR 140 outputs N text segments (as part of an N-best list), the NLU may process all N outputs to obtain NLU results.

As will be discussed further below, the NLU process may be configured to parse and tag to annotate text as part of NLU processing. For example, for the text "order ice cream and milk," "order" may be tagged as a command (to purchase items) and "ice cream" and "milk" may be tagged as the naming identifiers of the items to be purchased.

To correctly perform NLU processing of speech input, an NLU process 142 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 962 receives a query in the form of ASR results and attempts to identify relevant grammars and lexical information that may be used to construe meaning. To do so, the NLU component 142 may begin by identifying potential domains that may relate to the received query. The NLU storage 973 includes a database of devices (974a-974n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home," "communications," "shopping," "music," "calendaring," etc. As such, each domain may be associated with a particular recognizer 963, language model and/or grammar database (976a-976n), a particular set of intents/actions (978a-978n), and a particular personalized lexicon (986). Each gazetteer (984a-984n) may include domain-indexed lexical information associated with a particular user and/or device. For example, the Gazetteer A (984a) includes domain-index lexical information 986aa to 986an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 964 parses the query to determine an intent or intents for each identified domain, where the intent corresponds to the action to be performed that is responsive to the query. Each domain is associated with a database (978a-978n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 964 identifies potential intents for each identified domain by comparing words in the query to the words and phrases in the intents database 978. In some instances, the determination of an intent by the IC component 964 is performed using a set of rules or templates that are processed against the incoming text to identify a matching intent.

In order to generate a particular interpreted response, the NER 962 applies the grammar models and lexical information associated with the respective domain to actually recognize a mention of one or more entities in the text of the query. In this manner, the NER 962 identifies "slots" or values (i.e., particular words in query text) that may be needed for later command processing. Depending on the complexity of the NER 962, it may also label each slot with a type of varying levels of specificity (such as noun, place, device name, device location, city, artist name, song name, amount of time, timer number, or the like). Each grammar model 976 includes the names of entities (i.e., nouns) commonly found in speech about the particular domain (i.e., generic terms), whereas the lexical information 986 from the gazetteer 984 is personalized to the user(s) and/or the device. For instance, a grammar model associated with the shopping domain may include a database of words commonly used when people discuss shopping.

The intents identified by the IC component 964 are linked to domain-specific grammar frameworks (included in 976) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (976) framework or frameworks may correspond to sentence structures such as "purchase item called 'Item A' from Marketplace A."

For example, the NER component 962 may parse the query to identify words as subject, object, verb, preposition, etc., based on grammar rules and/or models, prior to recognizing named entities. The identified verb may be used by the IC component 964 to identify intent, which is then used by the NER component 962 to identify frameworks. A framework for the intent of "play a song," meanwhile, may specify a list of slots/fields applicable to play the identified "song" and any object modifier (e.g., specifying a music collection from which the song should be accessed) or the like. The NER component 962 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 962 may search the database of generic words associated with the domain (in the knowledge base 972). So, for instance, if the query was "identify this song," after failing to determine which song is currently being output, the NER component 962 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 950. The destination speechlet 950 may be determined based on the NLU output. For example, if the NLU output includes a command to send a message, the destination speechlet 950 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the speechlet 950 may provide some or all of this information to a text-to-speech (TTS) engine. The TTS engine may then generate an actual audio file for outputting the audio data determined by the application (e.g., "okay," or "items ordered").

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 142 during runtime operations where NLU operations are performed on text (such as text output from an ASR component 140). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 963. Each recognizer may include various NLU components such as an NER component 962, IC component 964 and other components such as an entity resolver, or other components.

For example, a messaging domain recognizer 963-A (Domain A) may have an NER component 962-A that identifies what slots (i.e., portions of input text) may correspond to particular words relevant to that domain. The words may correspond to entities such as (for the messaging domain) a recipient. An NER component 962 may use a machine learning model, such as a domain specific conditional random field (CRF) to both identify the portions corresponding to an entity as well as identify what type of entity corresponds to the text portion. The messaging domain recognizer 963-A may also have its own intent classification (IC) component 964-A that determines the intent of the text assuming that the text is within the proscribed domain. An IC component may use a model, such as a domain specific maximum entropy classifier to identify the intent of the text, where the intent is the action the user desires the system to perform. For this purpose, device 102 (a)-(d) may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the system 106, as illustrated herein are exemplary, and may be located in a stand-alone device or may be included, in whole or in part, as a component of a larger device or system, may be distributed across a network or multiple devices connected by a network, etc.

Figure 10:
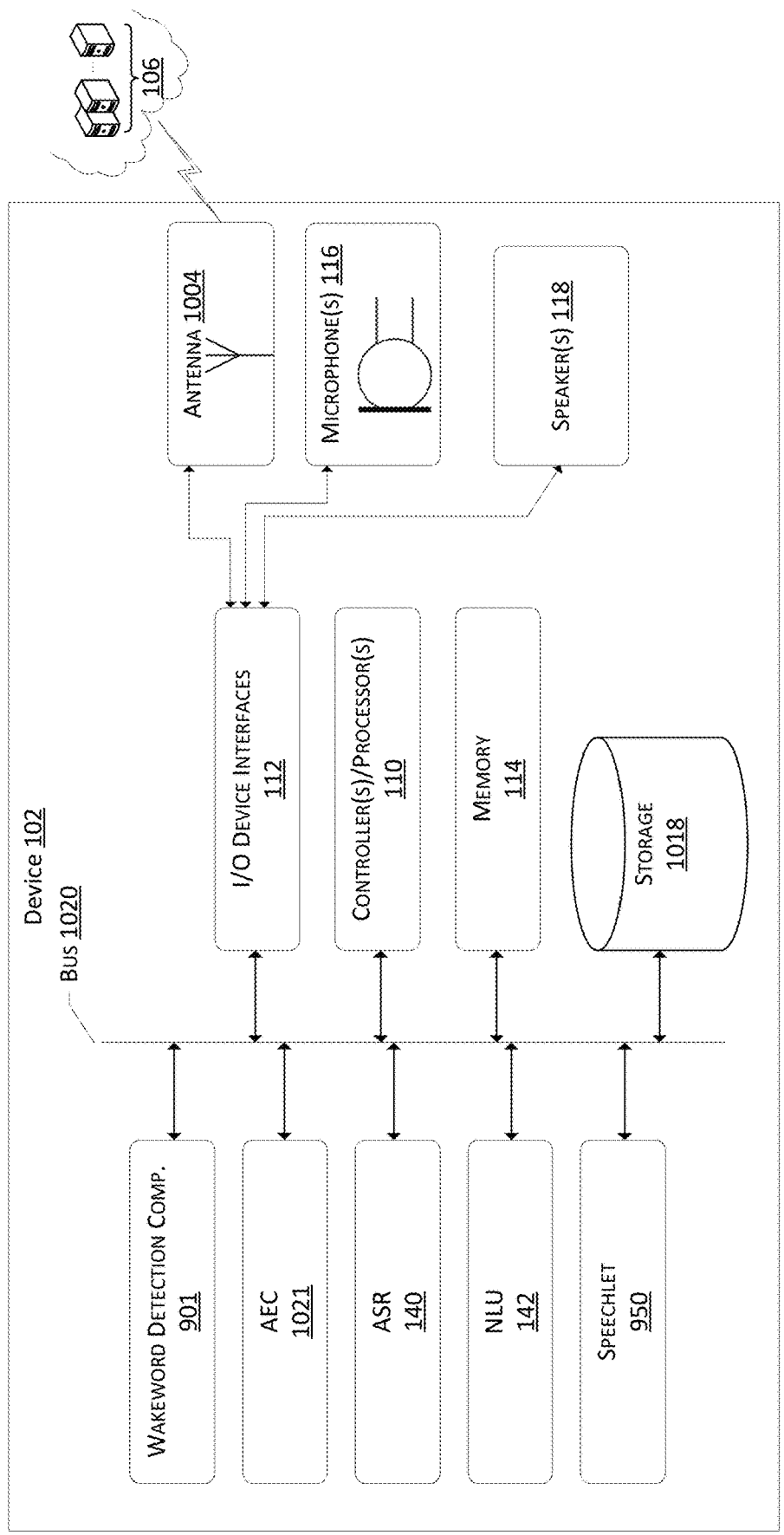
FIG. 10 illustrates a conceptual diagram of components of an example device that may receive and utilize device control suggestions.

FIG. 10 illustrates a conceptual diagram of components of an example connected device from which sensor data may be received for device functionality control utilizing activity prediction. For example, the device may include one or more electronic devices such as voice interface devices (e.g., smart speaker devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices may be situated in a home associated with the first user profile, in a place a business, healthcare facility (e.g., hospital, doctor's office, pharmacy, etc.), in vehicle (e.g., airplane, truck, car, bus, etc.) in a public forum (e.g., shopping center, store, etc.), for example. A second user profile may also be associated with one or more other electronic devices, which may be situated in home or other place associated with the second user profile, for example. The device 102 may be implemented as a standalone device that is relatively simple in terms of functional capabilities with limited input/output components, memory, and processing capabilities. For instance, the device 102 may not have a keyboard, keypad, touchscreen, or other form of mechanical input. In some instances, the device 102 may include a microphone 116, a power source, and functionality for sending generated audio data via one or more antennas 1004 to another device and/or system.

The device 102 may also be implemented as a more sophisticated computing device, such as a computing device similar to, or the same as, a smart phone or personal digital assistant. The device 102 may include a display with a touch interface and various buttons for providing input as well as additional functionality such as the ability to send and receive communications. Alternative implementations of the device 102 may also include configurations as a personal computer. The personal computer may include input devices such as a keyboard, a mouse, a touchscreen, and other hardware or functionality that is found on a desktop, notebook, netbook, or other personal computing devices. In examples, the device 102 may include an automobile, such as a car. In other examples, the device 102 may include a pin on a user's clothes or a phone on a user's person. In examples, the device 102 and may not include speaker(s) and may utilize speaker(s) of an external or peripheral device to output audio via the speaker(s) of the external/peripheral device. In this example, the device 102 might represent a set-top box (STB), and the device 102 may utilize speaker(s) of another device such as a television that is connected to the STB for output of audio via the external speakers. In other examples, the device 102 may not include the microphone(s) 116, and instead, the device 102 can utilize microphone(s) of an external or peripheral device to capture audio and/or generate audio data. In this example, the device 102 may utilize microphone(s) of a headset that is coupled (wired or wirelessly) to the device 102. These types of devices are provided by way of example and are not intended to be limiting, as the techniques described in this disclosure may be used in essentially any device that has an ability to recognize speech input or other types of natural language input.

The device 102 of FIG. 10 may include one or more controllers/processors 110, that may include a central processing unit (CPU) for processing data and computer-readable instructions, and memory 114 for storing data and instructions of the device 102. In examples, the skills and/or applications described herein may be stored in association with the memory 114, which may be queried for content and/or responses as described herein. The device 102 may also be connected to removable or external non-volatile memory and/or storage, such as a removable memory card, memory key drive, networked storage, etc., through input/output device interfaces 112.

Computer instructions for operating the device 102 and its various components may be executed by the device's controller(s)/processor(s) 110, using the memory 114 as "working" storage at runtime. A device's computer instructions may be stored in a non-transitory manner in non-volatile memory 114, storage 1018, or an external device(s). Alternatively, some or all of the executable instructions may be embedded in hardware or firmware on the device 102 in addition to or instead of software.

The device 102 may include input/output device interfaces 112. A variety of components may be connected through the input/output device interfaces 112. Additionally, the device 102 may include an address/data bus 1020 for conveying data among components of the respective device. Each component within a device 102 may also be directly connected to other components in addition to, or instead of, being connected to other components across the bus 1020.

The device 102 may include a display, which may comprise a touch interface. Any suitable display technology, such as liquid crystal display (LCD), organic light emitting diode (OLED), electrophoretic, and so on, may be utilized for the displays. Furthermore, the processor(s) 110 may comprise graphics processors for driving animation and video output on the associated display. As a way of indicating to a user that a connection between another device has been opened, the device 102 may be configured with one or more visual indicators, such as the light element(s), which may be in the form of LED(s) or similar components (not illustrated), that may change color, flash, or otherwise provide visible light output, such as for a notification indicator on the device 102. The input/output device interfaces 112 that connect to a variety of components. This wired or a wireless audio and/or video port may allow for input/output of audio/video to/from the device 102. The device 102 may also include an audio capture component. The audio capture component may be, for example, a microphone 116 or array of microphones, a wired headset or a wireless headset, etc. The microphone 116 may be configured to capture audio. If an array of microphones is included, approximate distance to a sound's point of origin may be determined using acoustic localization based on time and amplitude differences between sounds captured by different microphones of the array. The device 102 (using microphone 116, wakeword detection component 1001, ASR component 140, etc.) may be configured to generate audio data corresponding to captured audio. The device 102 (using input/output device interfaces 112, antenna 1004, etc.) may also be configured to transmit the audio data to the remote system 106 for further processing or to process the data using internal components such as a wakeword detection component 901.

Via the antenna(s) 1004, the input/output device interface 112 may connect to one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s), the system may be distributed across a networked environment. Accordingly, the device 102 and/or the remote system 106 may include an ASR component 140. The ASR component 140 of device 102 may be of limited or extended capabilities. The ASR component 140 may include language models stored in ASR model storage component, and an ASR component 140 that performs automatic speech recognition. If limited speech recognition is included, the ASR component 140 may be configured to identify a limited number of words, such as keywords detected by the device, whereas extended speech recognition may be configured to recognize a much larger range of words.

The device 102 and/or the remote system 106 may include a limited or extended NLU component 142. The NLU component 142 of device 102 may be of limited or extended capabilities. The NLU component 142 may comprise a name entity recognition module, an intent classification module and/or other components. The NLU component 142 may also include a stored knowledge base and/or entity library, or those storages may be separately located.

In examples, AEC may also be performed by the device 102. In these examples, the operations may include causing the AEC component 1021 to be enabled or otherwise turned on, or the operations may include causing the AEC component 1021 to transition from a first mode to a second mode representing a higher sensitivity to audio data generated by the microphone 116. The AEC component 1021 may utilize the audio data generated by the microphone 116 to determine if an audio fingerprint of the audio data, or portion thereof, corresponds to a reference audio fingerprint associated with the predefined event.

The device 102 and/or the remote system 106 may also include a speechlet 950 that is configured to execute commands/functions associated with a spoken command as described herein. The device 102 may include a wakeword detection component 901, which may be a separate component or may be included in an ASR component 140. The wakeword detection component 901 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred.

Figure 11:
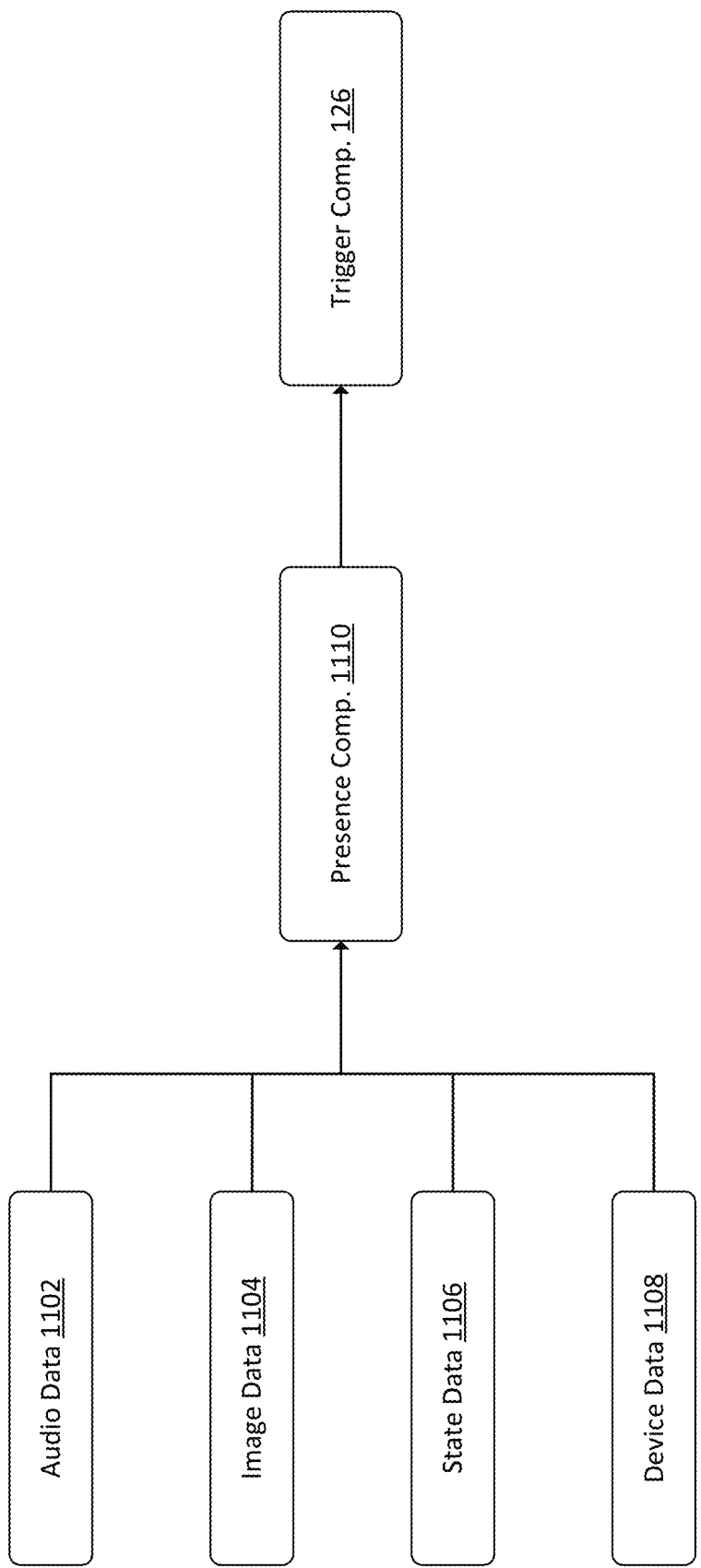
FIG. 11 illustrates a conceptual diagram of example presence detection utilized for generation of device control suggestions.

FIG. 11 illustrates a conceptual diagram of example presence detection utilized for device functionality control. FIG. 11 depicts example data types that may be utilized by a presence component 1110 to detect the presence of a user in an environment.

Example data types for detecting presence may include audio data 1102, image data 1104, state data 1106, and/or device data 1108. The audio data 1102 may be received from a microphone associated with an environment where a given device is situated. The audio data 1102 may be analyzed by the presence component 1110 to determine whether the audio data 1102 indicates the presence of user speech, footsteps, use of devices in the environment, and/or the presence of other noises that are indicative of a user being present. To do so, the presence component 1110 may compare the audio data 1102 to reference audio data to detect the presence of such noises. In examples where user speech is to be detected, ASR data may be utilized and/or detection of a wake word may be utilized.

When image data 1104 is described herein as being analyzed, that analysis may include the use of computer vision to identify objects depicted in the image data 1104. For example, with respect to computer vision techniques, computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading-Reading of 2D codes such as data matrix and QR codes. Facial Recognition. Shape Recognition Technology (SRT)—Differentiating human beings (e.g., head and shoulder patterns) from objects.

Some functions and components (e.g., hardware) found in many computer vision systems are described here. For example, a digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance. Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales. Image features at various levels of complexity are extracted from the image data. Typical examples of such features are: Lines, edges, and ridges; Localized interest points such as corners, blobs, or points: More complex features may be related to texture, shape, or motion. At some point in the processing a decision may be made about which image points or regions of the image are relevant for further processing. Examples are: Selection of a specific set of interest points: Segmentation of one or multiple image regions that contain a specific object of interest: Segmentation of the image into nested scene architecture comprising foreground, object groups, single objects, or salient object parts (also referred to as spatial-taxon scene hierarchy). At this point, the input may be a small set of data, for example a set of points or an image region that is assumed to contain a specific object. The remaining processing may comprise, for example: verification that the data satisfy model-based and application-specific assumptions: estimation of application-specific parameters, such as object pose or object size: classifying a detected object into different categories; and comparing and combining two different views of the same object. Making the final decision required for the application, for example match/no-match in recognition applications, may then be performed.

When state data 1106 is utilized, the state data 1106 may indicate when and how device states have changed for devices in the environment. For example, when a smart light is turned on, an indication of the change of state from off to on may be stored. The state itself, or the timing of the state change may indicate that a user is present in the environment and/or that the user is likely present.

When device data 1108 is utilized, the device data 1108 may indicate the presence of a personal device associated with a user, such as a mobile phone and/or a wearable device. These devices may send out beacons that are received at a given primary device, indicating that the devices are proximate to the primary device and also indicating that the user associated with such devices are present.

The data associated with the presence event may be any data that may be utilized by the trigger component 126 to determine a predefined activity, if any, that is occurring in association with an environment in which a target device is situated.

For example, sensor data may be received from the one or more connected devices in an environment associated with the target device. The one or more connected devices may be Internet-of-Things (IoT) devices that may generate data indicating one or more attributes of the environment. For example, the connected devices may include a device having a microphone configured to capture audio representing sounds made within the environment and to generate corresponding audio data that may be analyzed as described herein. The connected devices may also include a device having a camera and/or motion sensor. The device having the camera may be configured to capture images of the environment and generate corresponding image data that may be analyzed as described herein. The device having the motion sensor may be configured to detect motion within a field of view of the device and to generate indications that motion has been detected. The connected devices may also include devices such as door locks, which may be configured to generate indications of when the door lock is engaged, or otherwise locked, and when the door lock is disengaged, or otherwise unlocked. The connected devices may also include devices having an audio-output component, such as a speaker, that may be configured to output audio into the environment. The connected devices may also include other devices that may be controlled utilizing, for example voice input and/or other user input such as user input received via a user interface. These connected devices may be, for example and not by way of limitation, lights, switches, plugs, vehicles, televisions, thermostats, doorbells, appliances, window treatments, security systems, etc. The connected devices may also include personal devices, such as cellphones, tablets, personal computers, etc., which may be configured to communicate with other devices within the environment when the personal devices are brought into the environment. Some or all of these devices may generate sensor data associated with the connected devices.

An activity model may be configured to receive the sensor data and to utilize the sensor data to determine one or more activities that users within the environment are engaged in. These activities may include whether users are present or not present in the environment. Additional details on presence detection are provided below. These activities may also include specific activities that a user is engaged in. For example, the activity model may be configured to utilize the sensor data to determine that a user is engaged in a cooking activity and/or an eating activity. Additional activities may include social gatherings, entry and/or exit from a given space within the environment, washing dishes, watching television, etc. The activities may also indicate specific users that are present within a given space, a number of occupants within a given space, and/or other indicators about users associated with the environment. To determine that a certain predefined activity is being performed, the activity model may be trained to determine that the predefined activity is being performed when certain sensor data is received. For example, the predefined activity of users being away from the environment may be based on an absence of sensor data indicating sounds associated with movement within the environment, the opening and closing of a garage door and/or an exterior door to the environment, an absence of sensor data indicating images associated with movement within the environment, an absence of device state changes, etc. By way of continued example, the predefined activity of a user being present within the environment may be based on motion detection within the environment, sensor data indicating sounds associated with movement within the environment, signals received from a personal device associated with a user, etc. Furthermore, with respect to given specific activities such as cooking, acoustic event detection techniques, as described more fully below, may be utilized to detect sounds that have been predefined to correspond to cooking, such as the filling of a pot with water, the sizzle sound made from frying, the turning on of an oven, chopping sounds, etc. Predefined activities such as cooking may also be determined from a prolonged presence detection of a user in a space indicated as a kitchen, for example. It should be understood that some or all of the sensor data described herein may be utilized to determine when a predefined activity is taking place within an environment, and the predefined activities may include those specifically used as examples herein and/or any other predefined activity that the activity model is trained to detect.

Figure 12:
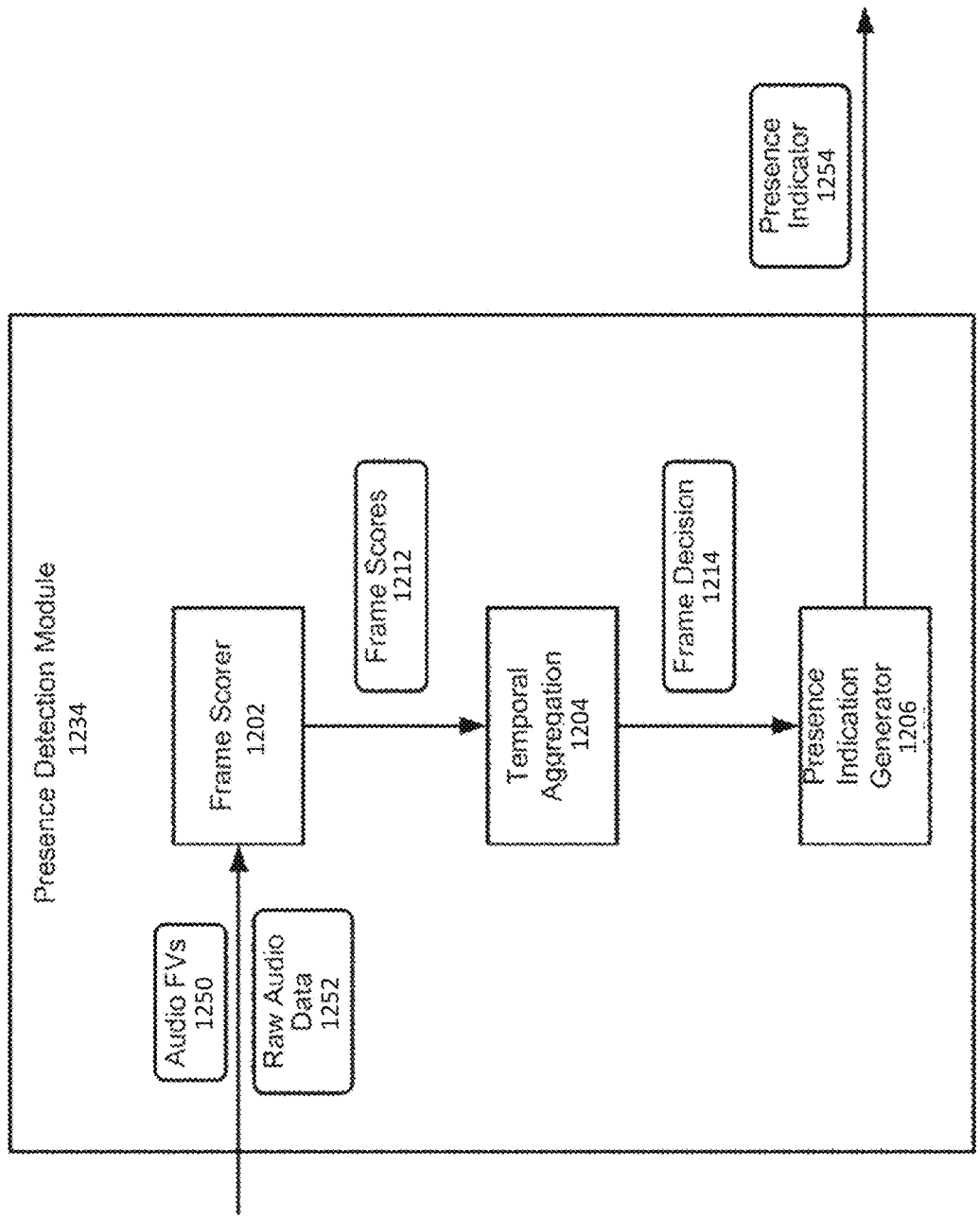
FIG. 12 illustrates processing of data related to presence detection by a device according to embodiments of the present disclosure.

FIG. 12 illustrates processing of data related to presence detection by a device according to embodiments of the present disclosure. In particular, a presence detection module 1234 may use one or more models to analyze audio data to determine if a user is present and/or an activity being performed by a user. As shown in FIG. 12, the presence detection module 1234 may include a number of components to process and analyze the audio data. Audio data, such as feature vectors 1250, and/or raw audio data 1252 may be input into a frame scorer 1202 which may operate a trained model using machine learning techniques (such as a DNN sound classifier) to score particular audio data as likely corresponding to human presence or not. For example, the frame scorer 1202 may process a feature vector 1250 representing a frame's worth of audio data and create a score 1212 representing a probability that the frame corresponds to user presence and/or a probability that the frame corresponds to a user performing a particular activity. The score 1212 may be a binary indicator (for example, 0 for no human/activity detected, 1 for human/activity detected) or may be a different value indicating a probability or likelihood of human/activity presence. The scores may be passed to a temporal aggregation machine learning techniques to determine whether an incoming frame level score is sufficient to decide whether the frame should be classified as human/activity detected YES or human/activity detected NO, represented by frame decision 1214. In making a decision for a particular frame, the temporal aggregation component 1204 may consider the score 1212 from the individual frame as well as potentially scores from other frames (e.g., a certain number of frames coming before or after) as well as reference frame-level scores to align the output of the temporal aggregation component 1204.

The temporal aggregation component 1204 may operate an HMM to alternate states between human/activity detected YES and human/activity detected NO. One example of such operation is a state machine approach. State S=0 may correspond to no human/activity presence detected while state S=1 corresponds to human/activity presence detected. The probability of staying at state 0 is indicated as $P_{0\ to\ 0}$. The device will stay at state 0 (for example when going from frame t to frame t+1) as represented by $S_{t+1}=P_t^*(1-a)+f_t^*a$ where $f_t$ is the frame level score 1212 for frame t, a is a configurable attack rate (e.g., a factor representing how quickly the system should transition from no presence detected to presence detected), and $P_t$ represents a weighted sum/cumulated version of $f_t$. $P_t$ may be set to an initial value (e.g., 1) and then may decay based on the formula for $P_{t+1}$ shown below. The device will stay at state 0 if $P_t^*(1-a)+f_t^*a<T_{0to1}$ where $T_{0to1}$ represents a configurable score threshold for transitioning from state 0 to state 1. Otherwise, the device will transition from state 0 to state 1 (e.g., $P_{t+1}=1$, shown as $P_{0\ to\ 1}$) if $P_t^*(1-a)+f_t^*a\ T_{0to1}$.

The device may stay at state 1 (shown as $P_{1\ to\ 1}$) as represented by $P_{t+1}=P_t^*r\ f_t^*(1-r)$ where r is a configurable release rate (e.g., a factor representing how quickly the system should transition from presence detected to no presence detected). The device will stay at state 1 if $P_t^*r+f_t^*(1-r)>T_{1to0}$ where $T_{1to0}$ represents a configurable score threshold for transitioning from state 1 to state 0. Otherwise the device will transition from state 1 to state 0 (e.g., $P_{t+1}=0$, shown as $P_{1\ to\ 0}$) if $P_t^*r+f_t^*(1-r)\le T_{1to0}$. Thresholds $T_{0to1}$ and $T_{1to0}$ and may be different, or may be the same.

While the decision 1214 is described as a frame decision, a decision may be made on groups of frames rather than (or in addition to) individual frames. Certain frames may be grouped and analyzed to decide whether the frames correspond to human presence being detected. Further, a classifier may be used to determine a presence decision for a frame or group of frames.

The temporal aggregation component 1204 may apply certain smoothing to avoid rapid changes in the frame decision 1214 (e.g., rapid state transitions). Such smoothing may account for natural pauses or breaks in audio that may not necessarily indicate a change in whether a human is present. For example, if the system detects washing dishes, then detects a momentary silence, then detects washing dishes again, the frames during the silence may correspond to scores 1212 corresponding to no presence detected even if the human who was washing is still in the vicinity of the device. To account for such audio fluctuations the temporal aggregation component 1204 may wait to change a state (e.g., a frame decision 1214) until a certain minimum number of frames are seen that have scores on the same side of the threshold. This minimum may be configured and may be different depending on which side of which threshold the frames appear.

As shown in FIG. 12, frame decisions 1214 may be passed to a presence indication generator 1206. The presence indication generator 1206 generates a periodic presence indicator 1254 which indicates the presence status at a particular point in time. The presence indication generator 1206 may generate a presence indicator 1254 according to a periodic schedule, for example every 5 seconds, 10 seconds, or the like. The presence indicator 1254 may be a representation of the frame decision taken at a particular moment in time. For example, if at time t, the frame decision is 1, the presence indicator 1254 corresponding to time t will be 1. Similarly, if at time t+30 seconds the frame decision is 1, the presence indicator 1254 for time t+30 will be 1, even if the frame decision for frames t+1 through t+29 were all 0. Alternatively, the presence indicator 1254 may be an average binary representation of the majority of frame decisions taken over a period of time. In the above example, the frame decision at t may be 1, but then if the frame decision for frames t+1 through t+29 were all 0, the frame decision for time t+30 will also be 0, even if the frame decision for time t+30 is 1. The presence indicator may also be calculated in other manners.

Figure 13:
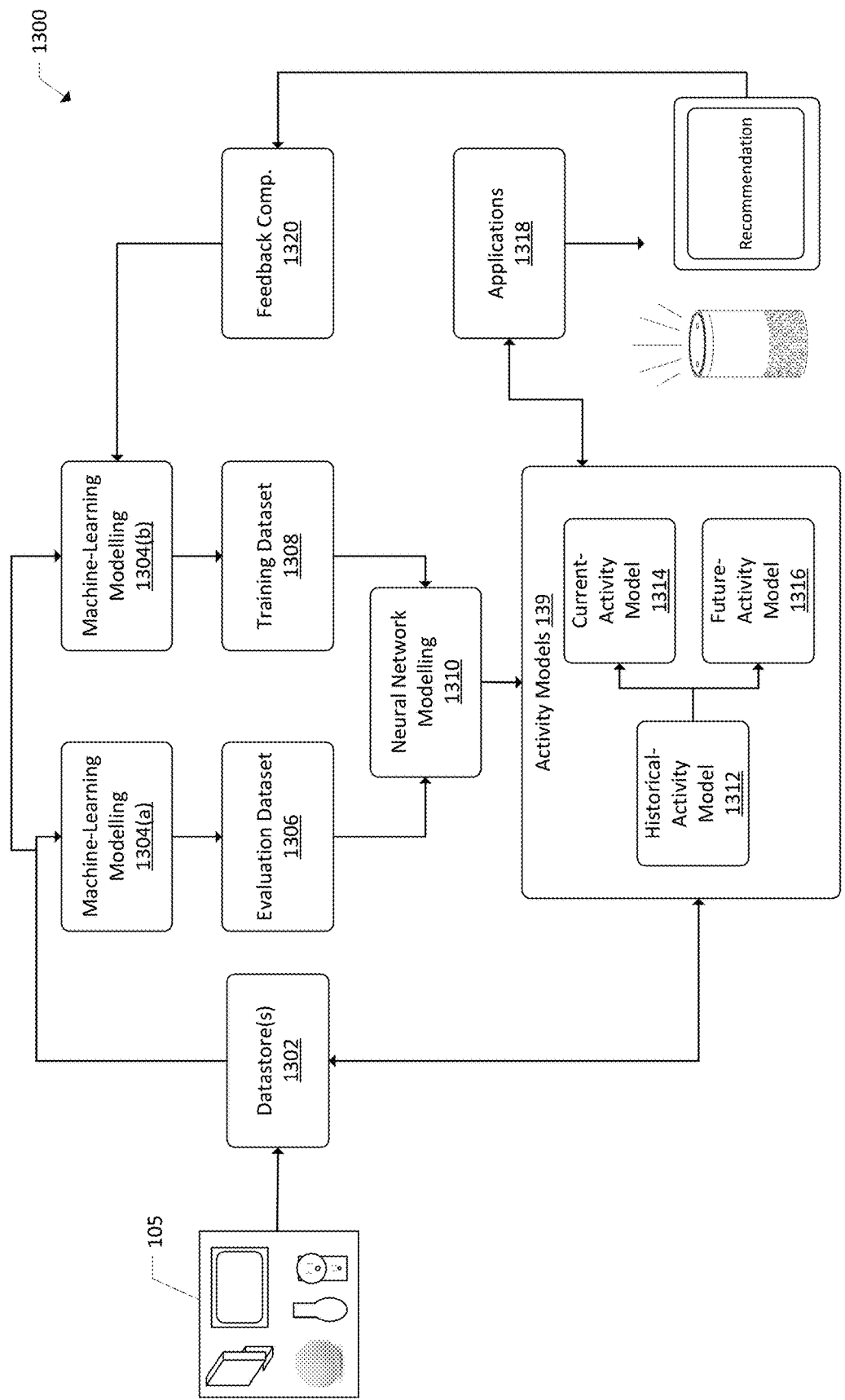
FIG. 13 illustrates a conceptual diagram of components of a system for training models for activity-based device recommendations.

FIG. 13 illustrates a conceptual diagram of components of a system 1300 for training models for activity modeling. The components of the system 1300 are described by way of example below.

For example, the one or more devices 105 may receive and/or send data indicating the state of the one or more devices, data indicating that a mobile device is in proximity to a given device such that the devices are in wireless communication with each other over a short-range communication network, data indicating the detection of movement in the environment, data indicating that an acoustic-event detection component of a device has identified an acoustic event, and/or other data such as naming indicators of the devices may be received and/or determined. This data may be generated and stored for devices associated with a given environment and/or for multiple electronic devices associated with multiple disparate environments. The devices and/or a system may generate and store this data, which may be utilized to generate and/or train models for determining the activity state associated with a given user profile. It should be understood that while examples of such event data are provided herein, those examples are not by way of limitation. Instead, the event data received from the devices may include any data that may indicate a state of the devices, other devices, and/or the environment.

The event data may be sent to the system, which may store the event data in one or more databases, such as the datastores 1302. The event data may be made available to one or more components of the system for activity modeling as described herein. For example, the machine-learning modelling 1304 (*a*)-(*b*) may be utilized to accept the event data, and/or a formatted version of the event data from the datastores 1302 and perform an analysis of the event data that includes labelling the event data with one or more indicators of an activity state. For example, machine-learning models may be configured to apply one or more rules to given events to label those events with an activity state. For example, event data indicating that a light has been turned on may be labeled by the machine-learning models as being associated with an active state, as opposed to an asleep state or an away state. A first machine-learning model may generate the training dataset 1308 that includes the event data and the labeling data associated with the event data. The training dataset 1308 may be stored in association with a training database. Additionally, in examples, one or more of the devices and/or user profiles associated with the devices may be predetermined to be included in the evaluation dataset 1306, which may also be stored in association with the training database. For example, certain devices may have sensors that are better suited for determining activity states and/or use of devices by given user profiles may be considered more beneficial for accurately determining activity states. In these examples, a portion of the event data corresponding to the predetermined devices and/or user profiles may be input into the separate machine-learning model to generate the evaluation dataset 1306. The evaluation dataset 1306 may represent a smaller subset of the event data utilized to generate the training dataset 1308. The evaluation dataset 1306 may be utilized by other models, as described more fully below, to test or otherwise determine the accuracy of the labeling associated with the training dataset 1308.

The neural network modelling 1310 may include accepting the evaluation dataset 1306 and/or the training dataset 1308 from the machine-learning models to generate and/or train one or more activity models 139. For example, the neural network modelling may represent a more robust machine-learning model than the machine-learning models utilized for machine-learning modelling 1304 (*a*)-(*b*) described herein. The neural network model may utilize the event data and the labeling data to identify events indicative of electronic devices and/or environments being in an active state, being in an asleep state, and/or being in an away state. The neural network model may also determine, over time, one or more trends in the event data indicating that certain events are more likely or less likely, depending on the circumstance, to indicate a given activity state. The trends may also include identifying events that were previously unlabeled by the machine-learning models that impact identification of activity state. By so doing, the neural network model may "learn" how certain events, such as for certain electronic devices and/or environments, impact determining activity states.

The activity models 139 generated and/or trained utilizing the neural network model may include one or more activity models 139 that are configured to accept event data and generate, as output, results indicating that given event data corresponds to a given activity state and, in examples, a confidence associated with the activity state determination. The activity models 139 may include the historical-activity model 1312, which may be configured to determine an activity state associated with historical events associated with an electronic device and/or environment. For example, the historical-activity model 1312 may be configured to accept, as features to the historical-activity model 1312, event data corresponding to historical events. The historical-activity model 1312 may generate, as output, data indicating that a given historical event corresponded to a given activity state. For example, the historical-activity model 1312 may be utilized to determine that a given time a week ago a given environment was associated with an asleep state based at least in part on the event data associated with that given time.

The activity models 139 may also include the current-activity model 1314, which may be configured to determine an activity state associated with a live or near-live event associated with an electronic device and/or environment. For example, the current-activity model 1314 may be configured to accept, as features to the current-activity model 1314, event data corresponding to live events and/or near-live events. In examples, use of the current-activity model 1314 may be in association with the electronic device and/or the system causing one or more sensors or other components of the electronic device to generate live or near-live event data to be utilized by the current-activity model 1314. The current-activity model 1314 may generate, as output, data indicating that a given live or near-live event corresponds to a given activity state. For example, the current-activity model 1314 may be utilized to determine that at a current time a given environment is associated with an active state based at least in part on event data associated with the current time. In examples, the current-activity model 1314 may be trained based at least in part on the output from the neural network model and/or from the output of the historical-activity model 1312.

The activity models 139 may also include the future-activity model 1316, which may be configured to predict an activity state associated with events that may occur in the future associated with an electronic device and/or environment. For example, the future-activity model 1316 may be configured to accept, as features to the future-activity model 1316, event data corresponding to the historical events and/or live or near-live events. The future-activity model 1316 may generate, as output, data indicating that a given event that is likely to occur at a given time in the future is likely to correspond to a given activity state. For example, the future-activity model 1316 may be utilized to determine that at a given time a week from now a given environment is likely to be associated with an away state based at least in part on historical event data and/or current event data associated with the given environment. In examples, the future-activity model 1316 may be trained based at least in part on the output from the neural network model and/or from the output of the historical-activity model 210 and/or the current-activity model 1314.

The activity models 139 may be made available to the one or more applications 1318 associated with the system and/or one or more other systems. For example, the one or more applications 1318 may be able to utilize activity state determinations to generate more accurate results and/or to determine when to perform certain operations, such as when to generate and/or send a notification and/or recommendation, when to operate a device, when to transition a state of a device, etc. In these examples, one or more of the applications 1318 may send request data to the activity models 139 for an indication of an activity of a device and/or environment in the past, now, or in the future. In some examples, the request data may indicate which of the activity models 139 are to be utilized for determining the activity state. In other examples, the request data may provide an indication of which events the application 1318 would like to determine the activity state for, and the remote system may determine which of the activity models 139 to utilize to provide results relevant to those events. The selected activity model 139 may then query the datastores 1302 for the event data relevant to the request from the application 1318 and utilize, as input to the selected activity model 139, features corresponding to the event data. The selected activity model 139 may output data indicating the determined activity state for the device and/or environment at issue and, in examples, a confidence value associated with the determined activity state. The application 1318 that sent the request data may then utilize the activity state as determined by the selected activity model 139 to perform one or more actions, such as the sending of a recommendation and/or the operation of a device, for example.

Additionally, in examples, users may provide user input indicating that the device is accurately or inaccurately in the indicated state. User input data corresponding to this user input may be sent from the device to the feedback component 1320. The feedback component 1320 may be configured to receive the user input data and utilize the user input data to train one or more of the machine-learning models and/or the neural network model. By so doing, the feedback component 1320 may generate a positive dataset, in situations where the user input indicates accurate activity state determinations, indicating an approximated ground truth that the events associated with a given activity state determination were in fact associated with the determined activity state. The feedback component 1320 may also generate a negative dataset, in situations where the user input indicates inaccurate activity state determinations, indicating that the events associated with that activity state determination were not associated with the determined activity state.

The activity models 139 may also be configured to select which data from the various devices is to be used and what data is specifically not to be used. For example, device state data from certain devices, such as security-related devices, may indicate activity states, but may not be used in the event that such data would result in an inaccurate prediction of activity state. For example, a door lock device may indicate that a door is currently unlocked. Such a signal may indicate that a user is present in the environment, even when other data indicates the user has moved away from the environment. Similarly, a garage door opening device may indicate that a garage door is open and thus that a user is potentially present even if the user has left the environment but forgot to close the garage door. Likewise, a security system may be in a disarmed state indicating the user is present, but again the user may have just forgot to arm the security system. In these and other examples, the device type of the devices at issue may be utilized to determine which device data to utilize for activity state prediction. In examples, data from device types associated with security-related functionality, such as door locks, security systems, garage doors, window sensors, door sensors, motion sensors, etc. may not be utilized or may be given limited weight when determine activity states of the system at issue.

Figure 14:
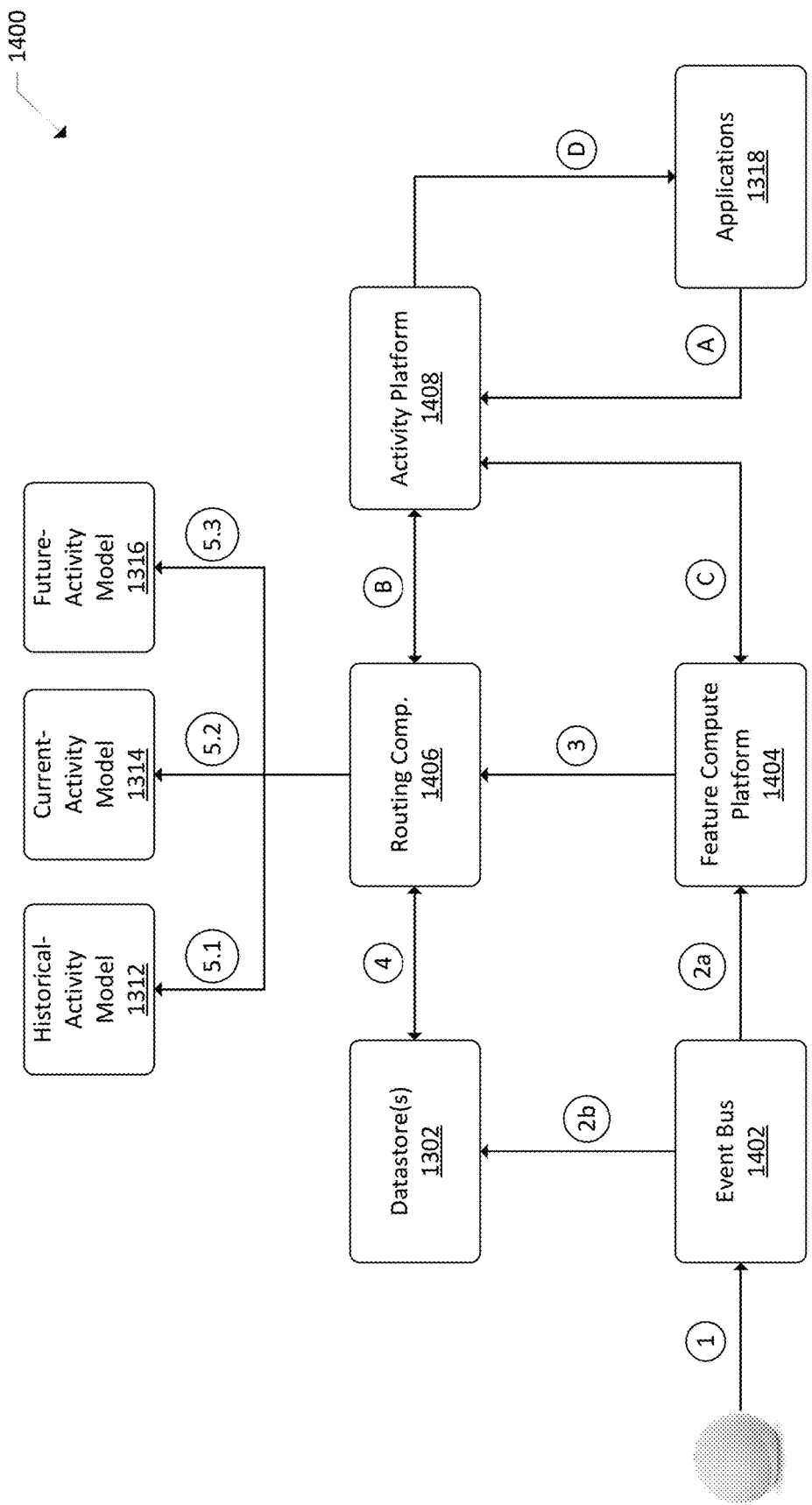
FIG. 14 illustrates a conceptual diagram of components of a system for utilizing activity models to determine an activity state associated with a given environment.

FIG. 14 illustrates a conceptual diagram of components of a system 1400 for utilizing smart home activity models to determine an activity state associated with a given environment. The components of FIG. 14 are described by way of example below:

At step 1, one or more electronic devices 105 may generate and/or send event data to a system. For example, data indicating the state of the one or more devices, data indicating that a mobile device is in proximity to a given device such that the devices are in wireless communication with each other over a short-range communication network, data indicating the detection of movement in the environment, data indicating that an acoustic-event detection component of the device has identified an acoustic event, and/or other data such as naming indicators of the devices may be received and/or determined. This data may be generated and stored for electronic devices associated with a given environment and/or for multiple electronic devices associated with multiple disparate environments. The electronic devices and/or a remote system may generate and store this data, which may be utilized to generate and/or train models for determining the activity state associated with a given user profile. It should be understood that while examples of such event data are provided herein, those examples are not by way of limitation. Instead, the event data received from the electronic devices may include any data that may indicate a state of the electronic devices, other devices, and/or the environment.

At step 2*a*, an event bus 1402 may receive the event data and may determine to send the event data to the feature compute platform 1404. For example, data of different types and/or containing different content may be received by the event bus 1402. The event bus 1402 may be configured to identify certain data as event data that may be relevant to activity state determination and may be configured to send such identified data to the feature compute platform 304 for further processing. Additionally, at step 2*b*, the event bus 1402 may send the event data to the datastore(s) 1302, which may store the event data for later use by the system 1300.

At step 3, the feature compute platform 1404 may format the event data or otherwise generate feature data corresponding to the event data that represents the event data as one or more features configured for input into one or more activity models. For example, each of the activity models may be configured to receive certain features and/or data that is formatted in a given manner. The feature compute platform 1404 may be configured to receive the raw event data and generate feature data that is useable by the activity models for determining activity states.

At step 4, the routing component 1406 may determine to send the feature data to the datastores 1302 for storage and use by the one or more activity models for training, testing, and/or activity state determination. For example, depending on the nature of the feature data, the feature data may not be designated for use in training the activity models but may be relevant for the activity models to utilize for determining activity states. In these examples, the feature data may be sent to the datastores 1302. In other examples, the feature data may be designed for a training dataset and/or an evaluation dataset, and in these examples the feature data may be provided to the activity models for use in training and/or testing the accuracy of the activity models for determining activity states.

At step 5.1, the routing component 1406 may query the datastores 1302 for feature data designated for the historical-activity model 1312 and may send the feature data to the historical-activity model 1312. The historical-activity model 1312 may accept the feature data from the routing component 1406 and the historical-activity model 1312 may be trained utilizing the feature data. Training of the historical-activity model 1312 may include determining which features are to be utilized for determining activity states and weighting of those features.

Alternatively, at step 5.2, the routing component 1406 may query the datastores 1302 for feature data designated for the current-activity model 1314 and may send the feature data to the current-activity model 1314. The current-activity model 1314 may accept the feature data from the routing component 1406 and the current-activity model 1314 may be trained utilizing the feature data. Training of the current-activity model 1314 may include determining which features are to be utilized for determining activity states and weighting of those features.

Alternatively, at step 5.3, the routing component 1406 may query the datastores 1302 for feature data designated for the future-activity model 1316 and may send the feature data to the future-activity model 1316. The future-activity model 1316 may accept the feature data from the routing component 1406 and the future-activity model 1316 may be trained utilizing the feature data. Training of the future-activity model 1316 may include determining which features are to be utilized for determining activity states and weighting of those features.

At step A, the one or more applications 1318 may send request data for utilizing the activity models to determine an activity state associated with a user profile and/or an environment. The request data may be received by the activity platform 1408. For example, the one or more applications 1318 may be able to utilize activity state determinations to generate more accurate results and/or to determine when to perform certain operations, such as when to generate and/or send a notification and/or recommendation, when to operate a device, when to transition a state of a device, etc. In these examples, one or more of the applications 1318 may send request data to the activity models for an indication of an activity of a device and/or environment in the past, now, or in the future. In some examples, the request data may indicate which of the activity models are to be utilized for determining the activity state. In other examples, the request data may provide an indication of which events the application 1318 would like to determine the activity state for, and the remote system may determine which of the activity models to utilize to provide results relevant to those events.

At step B, the activity platform 1408 may send a command to the routing component 1406 requesting utilization of one or more of the activity models to determine the requested activity state. The routing component 1406 may query the datastores for feature data relevant to the request and may send a command to a selected activity model to utilize the feature data for determining the requested activity state.

In some examples, at step C, the activity platform 1408 may also request the event data and/or the feature data itself for use by the application 1318. In these examples, the activity platform 1408 may query the feature compute platform 1404 to the feature data and/or the event data, which may be sent to the activity platform 1408.

At step D, the indication of the activity state as determined by the selected activity model and/or the feature data from the feature compute platform 1404 may be sent from the activity platform 1408 to the applications 1318 for use by those applications. By utilizing the activity models described above, the applications 1318 may utilize activity state determinations to determine when and/or how to send recommendations, when to cause certain devices to transition to certain modes, and/or when to perform other actions associated with the devices.

Figure 15:
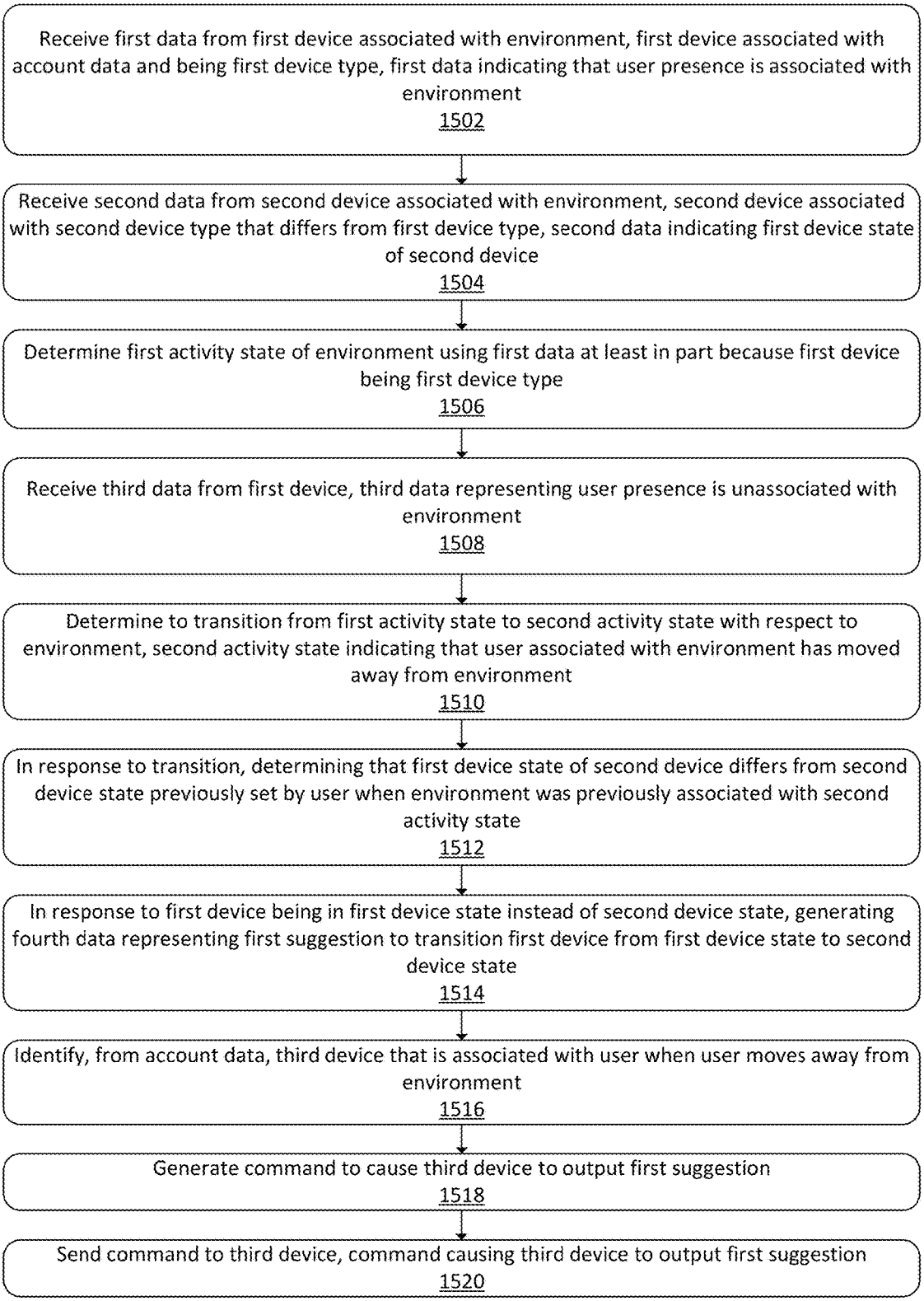
FIG. 15 illustrates a flow diagram of an example process for state determination and device control.

FIG. 15 illustrates a flow diagram of an example process 1500 for state determination and device control. The order in which the operations or steps are described is not intended to be construed as a limitation, and any number of the described operations may be combined in any order and/or in parallel to implement process 1500.

At block 1502, the process 1500 may include receiving first data from a first device associated with an environment, the first device associated with account data and being a first device type, the first data indicating that a user presence is associated with the environment. The first data may indicate device states of the first device, sensor data collected by the first device, and/or data indicating presence event determinations by the first device, as described in more detail elsewhere herein. The first device type may be a device type that is not associated with security-related functionality and/or that is predesignated to be utilized to determine activity states.

At block 1504, the process 1500 may include receiving second data from a second device associated with the environment, the second device associated with a second device type that differs from the first device type, the second data indicating a first device state of the second device. The second device type may be a device type that is associated with security-related functionality and/or that is predesignated to not be utilized to determine activity states.

At block 1506, the process 1500 may include determining a first activity state of the environment using the first data at least in part because the first device being the first device type. For example, activity models may also be configured to select which data from the various devices is to be used and what data is specifically not to be used. For example, device state data from certain devices, particularly security-related devices, may indicate activity states, but may not be used in the event that such data would result in an inaccurate prediction of activity state. For example, a door lock device may indicate that a door is currently unlocked. Such a signal may indicate that a user is present in the environment, even when other data indicates the user has moved away from the environment. Similarly, a garage door opening device may indicate that a garage door is open and thus that a user is potentially present even if the user has left the environment but forgot to close the garage door. Likewise, a security system may be in a disarmed state indicating the user is present, but again the user may have just forgot to arm the security system. In these and other examples, the device type of the devices at issue may be utilized to determine which device data to utilize for activity state prediction. In examples, data from device types associated with security-related functionality, such as door locks, security systems, garage doors, window sensors, door sensors, motion sensors, etc. may not be utilized or may be given limited weight when determine activity states of the system at issue.

At block 1508, the process 1500 may include receiving third data from the first device, the third data representing the user presence is unassociated with the environment. For example, the third data may indicate that the user has moved away from the environment. Additional details on what signals may be utilized to determine activity states are provided elsewhere herein.

At block 1510, the process 1500 may include determining to transition from the first activity state to a second activity state with respect to the environment, the second activity state indicating that a user associated with the environment has moved away from the environment. For example, acoustic event detection techniques may be utilized to detect sounds within the environment that are indicative of user presence, such as talking, footsteps, the use of appliances, etc. Additionally, or alternatively, when approved to do so by user account data, image data associated with the environment may be processed to determine that an object in the environment is a user and/or that an object is moving such that presence is indicated. Additionally, or alternatively, device data such as the detection of a user personal device within the environment and/or movement of the user personal device may indicate presence. Additionally, or alternatively, state data indicating the changing of device states for devices of the environment may indicate that a user is present in the environment. These and other examples for detecting user presence and the transition of user presence associated with an environment are described in more detail below:

At block 1512, the process 1500 may include, in response to the transition, determining that the first device state of the second device differs from a second device state previously set by the user when the environment was previously associated with the second activity state. For example, the second activity state may be associated with device states of the various devices of the account data. When a current device state differs from the device state associated with the second activity state, a determination of such an occurrence may be made.

At block 1514, the process 1500 may include, in response to the first device being in the first device state instead of the second device state, generating fourth data representing a first suggestion to transition the first device from the first device state to the second device state. To illustrate utilizing the three suggestion models highlighted above as an example, the lock suggestion model may determine whether the account data associated with the environment at issue indicates that security-related device control suggestions are eligible to be sent. For example, the account data may indicate whether user preferences have been set up and indicate that suggestions are enabled. The account data may also indicate whether the environment includes a device with a device type associated with the suggestion model and/or whether the account data indicates that the user has a personal user device to send data representing the suggestion to. When the account data indicates that the security-related device control suggestion is eligible to be sent, data associated with the devices at issue, the environment, and/or the trigger event may be received. This data may include indicators of the state of devices in the environment, particularly the lock device associated with the lock suggestion model. Thereafter, a candidate generator of the lock suggestion model may generate candidate suggestions and may rank those candidate suggestions based at least in part on the collected data, the trigger event, confidence values associated with the trigger event, and/or other factors associated with the environment and the presence state at issue. Additionally, a guardrail component may be configured to apply one or more rules to ensure that a to-be-sent suggestion is desirable to be sent. For example, the rules may indicate that only one or a given number of suggestions and/or suggestion types are to be sent in a given period of time. The guardrail component may utilize historical use data associated with previously-sent suggestions and/or user feedback data from previously-sent suggestions to determine the one or more rules. Other guardrails may include determining an amount of time from when the presence state transition was detected and determining to only send suggestions once a threshold amount of time has passed. This may prevent a suggestion from being sent before the user has an opportunity to operate the devices at issue without a suggestion. Other suggestions models, such as a garage door suggestion model and a security system suggestion model, for example, may perform similar processes associated with those devices and/or systems to determine whether a device control suggestion should be sent, and if so what the suggestion should be.

At block 1516, the process 1500 may include identifying, from the account data, a third device that is associated with the user when the user moves away from the environment. For example, given account data may be associated with identifiers of multiple devices. Those devices may include tablet computers, laptop computers, desktop computers, mobile phone devices, earbuds or otherwise headphones, watches and/or other wearable devices, automobiles, televisions, smart home accessory devices, etc. Additionally, when more than one user is associated with an environment, some of the devices may be associated with particular users while other devices may be considered communal devices that are utilized frequently by multiple users. In these and other examples, the device selector may be configured to determine which of the devices associated with account data should be selected for receiving the suggestion. To do so, the device selector may utilize presence data associated with the presence detection and/or historical data associated with user presence to determine the user profile of the user that has left the environment. For example, the presence data may indicate that a device associated with the user, such as a mobile phone, earbuds, automobile, etc., has ceased being detected when the presence state transitioned from a home state to an away state. This may indicate that the user that left the environment took the device at issue with the user. In these examples, this device may be selected as the device to receive the suggestion. In other examples, user identification may be performed based at least in part on the presence data. The user identification may include determining a user profile of the user from speech recognition data, from image-based analysis, from device-based beaconing, etc. In these examples, the user profile of the user may indicate one or more personal devices associated with the user. Those personal devices may be selected for receiving the suggestion. In still other examples, user preferences and/or default rules for receiving suggestions may be utilized. For example, a parent, caretaker, or other individual may be designated to receive device control suggestions, even in examples where the presence state transition did not involve that individual. The device selector may also select the device based at least in part on the type of suggestion. For example, when the suggestion is associated with closing a garage door, the device selector may select an automobile or device associated with an automobile of the user to receive the suggestion.

At block 1518, the process 1500 may include generating a command to cause the third device to output the first suggestion. For example, a command generator may be configured to receive the suggestion data and to generate one or more commands that, when received at the selected device, cause the selected device to present the suggestion and/or present an indicator of the suggestion. For example, in some examples the suggestion may be presented automatically or otherwise without receiving user input to output the suggestion. These types of "barge in" suggestions may be provided based at least in part on the suggestion at issue, user preferences, the type of device selected to receive the suggestion, feedback data, historical use of suggestions, etc. In other examples, the command may be sent to the selected device and may cause the selected device to display an indicator that a suggestion is available. When the user provides user input to output the suggestion, the selected device may cause the suggestion to be output.

At block 1520, the process 1500 may include sending the command to the third device, the command causing the third device to output the first suggestion. Once the command is generated as described herein, a notification component of the system may be configured to send the command, including the suggestion data, to the selected device. In examples, determining whether to output the suggestion with or without user input may be based at least in part on the device selected to receive the suggestion. For example, if the selected device is earbuds or headphones, particularly where the state data of that device indicate it is currently outputting audio, the suggestion may be automatically output. Additionally, when the device is an automobile or other device where the user's hands are already likely engaged, the suggestion may be output automatically. In other examples where the user is likely to be able to provide user input, the command may cause the notification of the suggestion to be presented and request user input prior to outputting the suggestion.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A method, comprising:
   receiving first data from a first device associated with an environment, the first device associated with a first device type;
   receiving second data from a second device associated with the environment, the second device associated with a second device type that differs from the first device type;
   determining a first environment activity state of the environment using the first data based at least in part on the first device being associated with the first device type;
   determining to transition from the first environment activity state to a second environment activity state with respect to the environment, the second environment activity state indicating that a user associated with the environment has moved away from the environment;
   based at least in part on determining to transition from the first environment activity state to the second environment activity state, determining that a first device state of the second device differs from a second device state associated with the second activity state; and
   based at least in part on the first device being in the first device state instead of the second device state, sending, to a third device, third data representing a first suggestion to transition the first device from the first device state to the second device state, wherein the third device differs from the second device.

2. The method of claim 1, further comprising:
   identifying, based at least in part on determining to transition from the first environment activity state to the second environment activity state, devices associated with security-related functionality of the environment, the devices including the second device and a fourth device;
   receiving fourth data indicating a third device state of the fourth device;
   generating, while generating the third data, fifth data representing a second suggestion to transition the fourth device from the third device state to a fourth device state, the fourth device state differing from the second device state associated with the second device; and
   wherein the third data causes the third device to output the second suggestion with the first suggestion.

3. The method of claim 1, further comprising:
   determining that fourth data representing a response to the first suggestion is absent;
   determining, based at least in part on the fourth data being absent, a fourth device associated with the user; and
   sending the third data representing the first suggestion to the fourth device.

4. The method of claim 1, further comprising:
   receiving fourth data indicating an event has occurred with respect to the environment, the event unassociated with detection of user presence;
   associating the event with the first suggestion based at least in part on the event occurring at a time associated with determining to transition from the first environment activity state to the second environment activity state; and
   wherein sending the third data is based at least in part on receiving fifth data indicating that the event has occurred.

5. The method of claim 1, further comprising:
generating, based at least in part on the second device being associated with the second device type, fourth data representing an explanation for sending the first suggestion, the fourth data generate utilizing the first data and the second data; and
wherein the first suggestion includes the explanation.

6. The method of claim 1, further comprising:
determining that the third device is outputting first audio at a time when the third data representing the first suggestion is generated;
based at least in part on the third device outputting the first audio, generating audio data representing the first suggestion; and
wherein the third data is configured to cause the third device to output second audio corresponding to the audio data instead of the first audio.

7. The method of claim 1, further comprising:
determining a fourth device associated with the second device type, wherein the first suggestion is associated with the second device and the fourth device;
generating, based at least in part on determining to transition from the first environment activity state to the second environment activity state, fourth data representing a second suggestion to transition a security system associated with the environment from a first state to a second state, the security system including the fourth device; and
determining to refrain from sending the second suggestion with the first suggestion based at least in part on the security system including the fourth device.

8. The method of claim 1, further comprising:
determining that the third device is associated with a subject matter of the first suggestion; and
selecting the third device from multiple devices based at least in part on the third device being associated with the subject matter of the first suggestion.

9. A system, comprising:
one or more processors; and
non-transitory computer-readable media storing computer-executable instructions that, when executed by the one or more processors, cause the one or more processors to perform operations comprising:
receiving first data from a first device associated with an environment, the first device associated with account data and having a first device type;
receiving second data from a second device associated with the environment, the second device associated with a second device type that differs from the first device type;
determining a first environment activity state of the environment using the first data based at least in part on the first device being associated with the first device type;
determining to transition from the first environment activity state to a second environment activity state with respect to the environment, the second environment activity state indicating that a user associated with the environment has moved away from the environment;
based at least in part on determining to transition from the first environment activity state to the second environment activity state, determining that a first device state of the second device differs from a second device state associated with the second environment activity state; and
based at least in part on the first device being in the first device state instead of the second device state, sending, to a third device, third data representing a first suggestion to transition the first device from the first device state to the second device state, wherein the third device differs from the second device.

10. The system of claim 9, the operations further comprising:
identifying, based at least in part on determining to transition from the first environment activity state to the second environment activity state, devices associated with security-related functionality of the environment, the devices including the second device and a fourth device;
receiving fourth data indicating a third device state of the fourth device;
generating, while generating the third data, fifth data representing a second suggestion to transition the fourth device from the third device state to a fourth device state, the fourth device state differing from the second device state associated with the second device; and
wherein the third data causes the third device to output the second suggestion with the first suggestion.

11. The system of claim 9, the operations further comprising:
determining that fourth data representing a response to the first suggestion is absent;
determining, based at least in part on the fourth data being absent, a fourth device associated with the user; and
sending the third data representing the first suggestion to the fourth device.

12. The system of claim 9, the operations further comprising:
receiving fourth data indicating an event has occurred with respect to the environment, the event unassociated with detection of user presence;
associating the event with the first suggestion based at least in part on the event occurring at a time associated with determining to transition from the first environment activity state to the second environment activity state; and
wherein sending the third data is based at least in part on receiving fifth data indicating that the event has occurred.

13. The system of claim 9, the operations further comprising:
generating, based at least in part on the second device being associated with the second device type, fourth data representing an explanation for sending the first suggestion, the fourth data generate utilizing the first data and the second data; and
wherein the first suggestion includes the explanation.

14. The system of claim 9, the operations further comprising:
determining that the third device is outputting first audio at a time when the third data representing the first suggestion is generated;
based at least in part on the third device outputting the first audio, generating audio data representing the first suggestion; and
wherein the third data is configured to cause the third device to output second audio corresponding to the audio data instead of the first audio.

15. The system of claim 9, the operations further comprising:

determining a fourth device associated with the second device type, wherein the first suggestion is associated with the second device and the fourth device;

generating, based at least in part on determining to transition from the first environment activity state to the second environment activity state, fourth data representing a second suggestion to transition a security system associated with the environment from a first state to a second state, the security system including the fourth device; and determining to refrain from sending the second suggestion with the first suggestion based at least in part on the security system including the fourth device.

16. The system of claim 9, the operations further comprising:

determining that the third device is associated with a subject matter of the first suggestion; and selecting the third device from multiple devices associated with the account data based at least in part on the third device being associated with the subject matter of the first suggestion.

17. The method of claim 1, further comprising:

determining that multiple suggestions have been generated for the first device; and selecting the first suggestion from the multiple suggestions based at least in part on an action type associated with the suggestion.

18. The method of claim 1, further comprising:

determining that multiple suggestions have been generated for the first device; and selecting the first suggestion from the multiple suggestions based at least in part on the first suggestion subsuming one or more other suggestions of the multiple suggestions.

19. The system of claim 9, the operations further comprising:

determining that multiple suggestions have been generated for the first device; and selecting the first suggestion from the multiple suggestions based at least in part on an action type associated with the suggestion.

20. The system of claim 9, the operations further comprising:

determining that multiple suggestions have been generated for the first device; and selecting the first suggestion from the multiple suggestions based at least in part on the first suggestion subsuming one or more other suggestions of the multiple suggestions.

\* \* \* \* \*